United States Patent
Ni et al.

(10) Patent No.: US 11,243,657 B2
(45) Date of Patent: Feb. 8, 2022

(54) ICON DISPLAY METHOD, AND APPARATUS

(71) Applicant: Huawei Technologies Co., Ltd., Shenzhen (CN)

(72) Inventors: Jing Ni, Beijing (CN); Xuan Zhou, Shenzhen (CN); Jie Xu, Shanghai (CN); Kai Qian, Beijing (CN); Yanfang Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 16/627,631

(22) PCT Filed: Jun. 28, 2017

(86) PCT No.: PCT/CN2017/090650
§ 371 (c)(1),
(2) Date: Dec. 30, 2019

(87) PCT Pub. No.: WO2019/000287
PCT Pub. Date: Jan. 3, 2019

(65) Prior Publication Data
US 2020/0371666 A1    Nov. 26, 2020

(51) Int. Cl.
| G06F 3/048 | (2013.01) |
| G06F 3/0481 | (2013.01) |
| G06F 3/0484 | (2013.01) |
| G06F 3/0488 | (2013.01) |
| G06F 3/044 | (2006.01) |

(52) U.S. Cl.
CPC ........ G06F 3/04817 (2013.01); G06F 3/0488 (2013.01); G06F 3/04845 (2013.01); G06F 3/044 (2013.01); G06F 2203/04108 (2013.01); G06F 2203/04804 (2013.01)

(58) Field of Classification Search
CPC ............. G06F 3/04817; G06F 3/04845; G06F 3/0488; G06F 3/044; G06F 2203/04108; G06F 2203/04804
See application file for complete search history.

(56) References Cited

U.S. PATENT DOCUMENTS

| 9,116,598 B1 * | 8/2015 | Yoden | G06F 3/04817 |
| 2009/0058830 A1 * | 3/2009 | Herz | G06F 3/0488 345/173 |
| 2011/0096033 A1 * | 4/2011 | Ko | G06F 3/0304 345/175 |
| 2011/0164063 A1 * | 7/2011 | Shimotani | G06F 3/0416 345/661 |

(Continued)

FOREIGN PATENT DOCUMENTS

| CN | 102981764 A | 3/2013 |
| CN | 103616972 A | 3/2014 |

(Continued)

Primary Examiner — Hugo Molina
(74) Attorney, Agent, or Firm — Conley Rose, P.C.

(57) ABSTRACT

An icon display method includes displaying, by a terminal, a first screen, where the first screen does not include a target icon, and displaying, by the terminal, a second screen including the target icon in response to a first gesture that is detected by the terminal and that hovers in a first position above a touchscreen.

20 Claims, 16 Drawing Sheets

(56) References Cited

U.S. PATENT DOCUMENTS

| | | | |
|---|---|---|---|
| 2012/0075212 A1* | 3/2012 | Park | G06F 3/0488 |
| | | | 345/173 |
| 2013/0085866 A1* | 4/2013 | Levitis | G06Q 30/0241 |
| | | | 705/14.69 |
| 2013/0111403 A1* | 5/2013 | Nakamura | B60K 35/00 |
| | | | 715/810 |
| 2014/0035850 A1* | 2/2014 | Shin | G06F 3/041 |
| | | | 345/173 |
| 2014/0059428 A1 | 2/2014 | Jeong et al. | |
| 2014/0139440 A1 | 5/2014 | Qu et al. | |
| 2014/0143698 A1 | 5/2014 | Kim et al. | |
| 2014/0240248 A1* | 8/2014 | Han | G06F 3/041 |
| | | | 345/173 |
| 2014/0267130 A1 | 9/2014 | Hwang et al. | |
| 2014/0344754 A1* | 11/2014 | Lai | G06F 3/04842 |
| | | | 715/830 |
| 2015/0149954 A1* | 5/2015 | Lin | G06F 3/0486 |
| | | | 715/781 |
| 2016/0098147 A1 | 4/2016 | Hills et al. | |
| 2016/0196034 A1 | 7/2016 | Chen | |
| 2017/0003812 A1 | 1/2017 | Kim et al. | |
| 2017/0115844 A1 | 4/2017 | Markiewicz | |
| 2017/0212643 A1* | 7/2017 | Stewart | G06F 3/0484 |
| 2017/0371455 A1 | 12/2017 | Dai et al. | |
| 2018/0210640 A1* | 7/2018 | Vijay Kumar | G06F 3/04883 |

FOREIGN PATENT DOCUMENTS

| | | |
|---|---|---|
| CN | 103631513 A | 3/2014 |
| CN | 103699326 A | 4/2014 |
| CN | 103823609 A | 5/2014 |
| CN | 104007922 A | 8/2014 |
| CN | 102968235 B | 12/2015 |
| CN | 105190520 A | 12/2015 |
| CN | 106030482 A | 10/2016 |
| CN | 106527896 A | 3/2017 |
| CN | 106598394 A | 4/2017 |

* cited by examiner

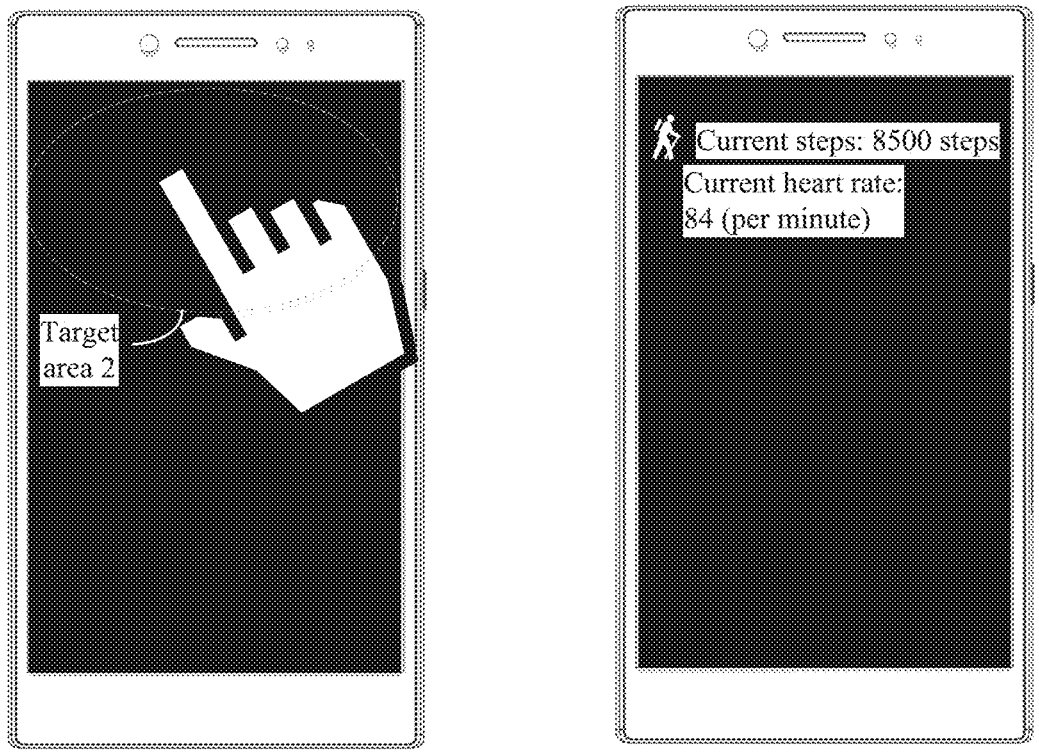
FIG. 13(a) Sports scenario
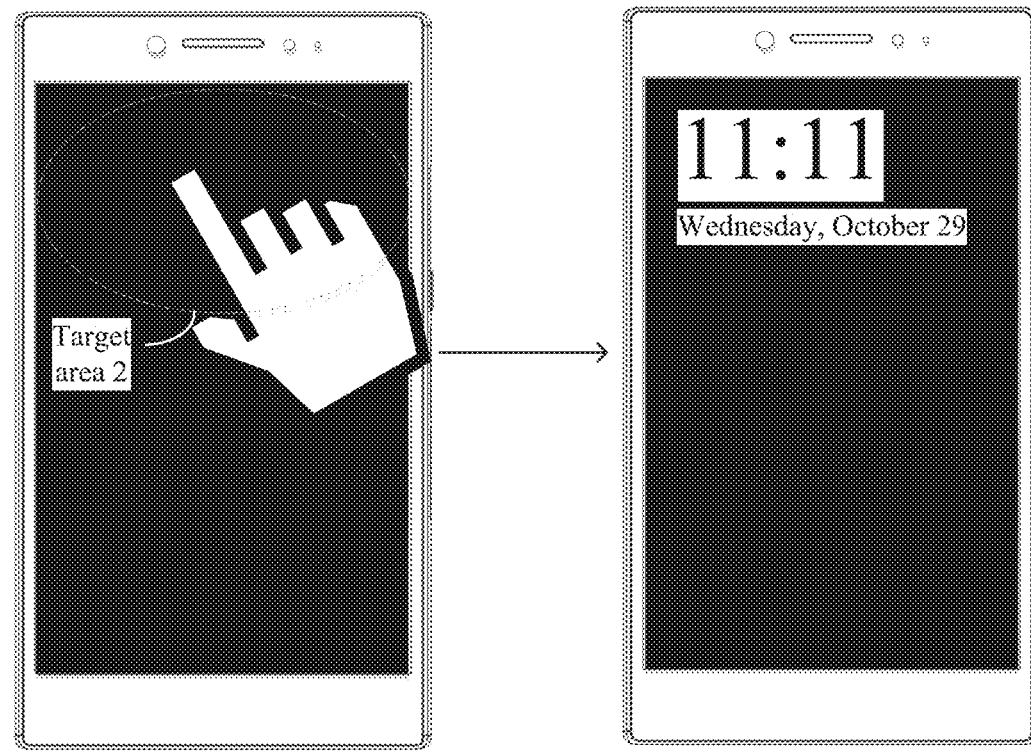
FIG. 13(b) Hand raise scenario

ICON DISPLAY METHOD, AND APPARATUS

CROSS-REFERENCE TO RELATED APPLICATIONS

This application is a U.S. National Stage Patent application of International Patent Application No. PCT/CN2017/090650 filed on Jun. 28, 2017, which is hereby incorporated by reference in its entirety.

TECHNICAL FIELD

Embodiments of the present invention relate to the field of display technologies, and in particular, to an icon display method and an apparatus.

BACKGROUND

Currently, to provide various types of visual output for a user, both a size and a screen-to-body ratio of a display screen of a terminal are becoming larger. When the size of the display screen is given, how to output more information required by a user on the limited screen becomes an issue to be resolved urgently.

An icon of each application or function of the terminal is usually displayed in a fixed position on the display screen, or an icon may be manually dragged by the user to a corresponding position for display. However, in a running process of the terminal, some icons that do not need to be operated in real time are always displayed on a current display screen. For example, as shown in FIG. 1, a virtual navigation button 101 on an Android mobile phone is fixedly displayed at the bottom of a display screen. Displaying these icons undoubtedly occupies screen space, and reduces a screen-to-body ratio of the display screen. For another example, an assistive touch (Assistive Touch) icon on an iPhone always floats on a current operation screen, and the icon may further shield currently displayed content.

SUMMARY

Embodiments of the present invention provide an icon display method and an apparatus, so that a particular icon can be displayed in a corresponding position as required by a user, and the icon can be prevented from always occupying display space.

The following technical solutions are used in the embodiments of the present invention to achieve the foregoing objective.

According to a first aspect, an embodiment of the present invention provides an icon display method, including: displaying, by a terminal, a first screen, where the first screen does not include a target icon; and displaying, by the terminal, a second screen including the target icon in response to a detected first gesture that hovers in a first position above a touchscreen.

In this case, when the target icon is hidden, the terminal may display, by using display space originally occupied by the target icon, information currently viewed by a user, for example, a video that is being played. However, when the user approaches a position above the touchscreen to trigger the first gesture, it indicates that a focus of the user has been transferred, and a corresponding function of the target icon needs to be triggered. In this case, the terminal may display the target icon on the touchscreen. In this way, the user can find and trigger the target icon in a timely manner by performing only one touch operation. In addition, according to the icon display method provided in this embodiment of the present invention, a corresponding target icon can be displayed in a corresponding position as required by the user. This prevents the target icon from occupying display space or shielding displayed content viewed by the user currently, to enable the user to obtain immersive user experience.

In a possible design method, the displaying, by the terminal, a second screen including the target icon includes: displaying, by the terminal, the second screen including the target icon, where the target icon is displayed in a second position, and a projection that is of the first position and is on the touchscreen coincides with the second position.

In this case, when the first gesture is detected, before a finger of a user really touches the touchscreen, the terminal may display, on the touchscreen, an icon of the function in a position that the user is ready to touch. In this way, the user can complete displaying and triggering of the target icon by performing only one touch operation. This avoids a process of searching for the target icon by the user, and improves man-machine interaction intelligence.

In a possible design method, after the displaying, by the terminal, a second screen including the target icon, the method further includes: if detecting, within a preset time, no operation for triggering the target icon, hiding, by the terminal, the target icon; or if detecting that a time in which a finger of a user hovers over the touchscreen is greater than a preset threshold, hiding, by the terminal, the target icon.

That is, when the user does not need to perform a related function of the target icon, the terminal may continue to hide the target icon, to prevent the target icon from occupying display space or shielding displayed content viewed by the user currently.

In a possible design method, the displaying, by the terminal, a second screen including the target icon includes: adjusting, by the terminal based on a detected distance between the finger of the user and the touchscreen, at least one of a size, transparency, color, and display frequency for displaying the target icon, to correspond to the detected distance. This attracts the user's attention and prompts the user to tap the target icon.

In a possible design method, the displaying, by the terminal, a second screen including the target icon in response to a detected first gesture includes: switching, by the terminal, from the displayed first screen to the second screen in response to the detected first gesture, where the second screen, the target icon is displayed in a target area on the touchscreen, and the target area is an area, on the touchscreen, from which a distance to the first position meets a preset condition, for example, an area in which the user can perform a one-hand operation on the touchscreen, to help the user implement a one-hand operation.

In a possible design method, the target icon is an icon of one or more navigation buttons.

In a possible design method, when the terminal is in a screen-off state, the target icon is an icon corresponding to the first position in a screen-on state.

According to a second aspect, an embodiment of the present invention provides an icon display method, including: displaying, by a terminal, a first screen, where the first screen does not include a target icon corresponding to an application that runs on a background currently; and switching, by the terminal, from the displayed first screen to a second screen in response to a detected first gesture that hovers in a first position above a touchscreen, where the second screen includes a target icon corresponding to at least one application that rims on the background.

In a possible design method, the terminal stores a correspondence between the first gesture and a target icon, and the target icon is a target icon corresponding to the first gesture.

In a possible design method, the terminal uses an icon corresponding to a current application scenario as the target icon. That is, the terminal may determine a related function that the user needs to use in the current application scenario. In this case, when the terminal detects the first gesture, before a finger of the user really touches the touchscreen, the terminal may display an icon of the function in a position that the user intends to touch on the touchscreen, to help the user perform a corresponding operation. In addition, before the first gesture is detected, the icon of the function does not occupy display space or interfere with a related operation that is being performed by the terminal.

In a possible design method, the switching, by the terminal, from the displayed first screen to a second screen in response to a detected first gesture includes: switching, by the terminal, from the displayed first screen to the second screen in response to the detected first gesture, where the second screen includes the target icon corresponding to the at least one application that runs on the background, the target icon is displayed in a target area on the touchscreen, and the target area is an area, on the touchscreen, from which a distance to the first position meets a preset condition.

In a possible design method, the switching, by the terminal, from the displayed first screen to a second screen in response to a detected first gesture includes: switching, by the terminal, from the displayed first screen to the second screen in response to the detected first gesture, where the target icon is displayed in a preset position on the second screen.

In a possible design method, a mutual-capacitance sensor and a self-capacitance sensor are disposed in the touchscreen, and the method further includes: when the terminal is in a screen-off state, disabling, by the terminal, the mutual-capacitance sensor, or reducing a frequency of scanning the mutual-capacitance sensor; and when the terminal is in a pocket mode, disabling, by the terminal, the self-capacitance sensor, or reducing a frequency of scanning the self-capacitance sensor. This reduces power consumed when the terminal enables a floating touch function.

In a possible design method, a mutual-capacitance sensor and a self-capacitance sensor are disposed in the touchscreen, and the method further includes: when detecting that the terminal is held, disabling, by the terminal, the self-capacitance sensor disposed in an edge area of the touchscreen. This prevents the terminal from mistakenly considering, when the terminal is held, that a self-capacitance signal generated at an edge of the touchscreen is a floating touch event triggered by the user.

According to a third aspect, an embodiment of the present invention provides a terminal, including: a detection unit, configured to detect a first gesture that hovers in a first position above a touchscreen; a processing unit, configured to instruct, based on obtained information about the first gesture detected by the detection unit, a display unit to display a second screen including the target icon; and the display unit, configured to: display a first screen, and switch from the displayed first screen to the second screen based on an instruction of the processing unit, where the first screen does not include the target icon.

In a possible design method, the processing unit is specifically configured to instruct, based on the obtained information about the first gesture detected by the detection unit, the display unit to display the second screen including the target icon in a second position, where a projection that is of the first position and is on the touchscreen coincides with the second position.

In a possible design method, the processing unit is further configured to: if no operation for triggering the target icon is detected within a preset time, hide the target icon; or if it is detected that a time in which a finger of a user hovers over the touchscreen is greater than a preset threshold, hide the target icon.

In a possible design method, the processing unit is further configured to adjust, based on a distance between the finger of the user and the touchscreen, a display parameter for displaying the target icon, where the display parameter includes at least one of a size, transparency, color, and display frequency of the target icon.

In a possible design method, the processing unit is specifically configured to switch from the displayed first screen to the second screen in response to the detected first gesture, where the target icon is displayed in a target area on the touchscreen, and the target area is an area, on the touchscreen, from which a distance to the first position meets a preset condition.

In a possible design method, the target icon is an icon of one or more navigation buttons.

In a possible design method, when the terminal is in a screen-off state, the target icon is an icon corresponding to the first position in a screen-on state.

According to a fourth aspect, an embodiment of the present invention provides a terminal, including: a detection unit, configured to detect a first gesture that hovers in a first position above a touchscreen; a processing unit, configured to instruct, in response to the detected first gesture, the display unit to switch from a displayed first screen to a second screen, where the second screen includes a target icon corresponding to at least one application that runs on a background; and the display unit, configured to: display a screen, namely, the first screen, based on an instruction of the processing unit, and switch from the first screen to the second screen, where the first screen does not include a target icon corresponding to an application that runs on the background currently, and the second screen includes the target icon corresponding to the at least one application that runs on the background.

In a possible design method, the terminal stores a correspondence between the first gesture and a target icon; and the processing unit is further configured to determine, based on the correspondence, a target icon corresponding to the first gesture.

In a possible design method, the processing unit is further configured to use an icon corresponding to a current application scenario as the target icon.

In a possible design method, the processing unit is specifically configured to: switch from the displayed first screen to the second screen in response to the detected first gesture, where the second screen includes the target icon corresponding to the at least one application that runs on the background; and display the target icon in a target area on the touchscreen, where the target area is an area, on the touchscreen, from which a distance to the first position meets a preset condition.

In a possible design method, the processing unit is specifically configured to switch from the displayed first screen to the second screen in response to the detected first gesture, where the target icon is displayed in a preset position on the second screen.

In a possible design method, a mutual-capacitance sensor and a self-capacitance sensor are disposed in the touchscreen. The processing unit is further configured to: when the terminal is in a screen-off state, disable the mutual-capacitance sensor, or reduce a frequency of scanning the mutual-capacitance sensor; and when the terminal is in a pocket mode, disable the self-capacitance sensor, or reduce a frequency of scanning the self-capacitance sensor.

In a possible design method, a mutual-capacitance sensor and a self-capacitance sensor are disposed in the touchscreen. The processing unit is further configured to: when it is detected that the terminal is held, disable the self capacitance sensor disposed in an edge area of the touchscreen.

According to a fifth aspect, an embodiment of the present invention provides a terminal, including one or more processors, one or more memories, and a touchscreen. The one or more memories are configured to store a computer executable instruction, the one or more processors are connected to the one or more memories, and when the terminal runs, the one or more processors execute the computer executable instruction stored in the one or more memories to cause the terminal to perform any one of the foregoing icon display methods.

According to a sixth aspect, an embodiment of the present invention provides a computer readable storage medium. The computer readable storage medium stores an instruction, and when the instruction is run on any one of the foregoing terminals, the terminal performs any one of the foregoing icon display methods.

According to a seventh aspect, an embodiment of the present invention provides a computer program product including an instruction. When the computer program product is run on any one of the foregoing terminals, the terminal performs any one of the foregoing icon display methods.

In the embodiments of the present invention, the names of the foregoing terminals constitute no limitation on devices. During actual implementation, these devices may appear in other names, provided that a function of each device is similar to that in the embodiments of the present invention, that is, falls within the scope of the claims of the present invention and equivalent technologies thereof.

In addition, for technical effects brought by any design manner of the second aspect to the seventh aspect, refer to the technical effects brought by the different design methods in the first aspect, and no details are repeated herein.

BRIEF DESCRIPTION OF DRAWINGS

FIG. 13(a) and FIG. 13(b) are a schematic diagram 9 of a scenario of an icon display method according to an embodiment of the present invention;

DESCRIPTION OF EMBODIMENTS

Figure 1:
FIG. 1 is a schematic diagram of an application scenario in which a terminal displays an icon in the prior art.

Terms "first" and "second" below are merely used for description, and shall not be understood as an indication or implication of relative importance or implicit indication of a quantity of indicated technical features. Therefore, a feature restricted by "first" or "second" may explicitly indicate or implicitly include one or more such features. In the descriptions in the embodiments of the present invention, unless otherwise stated, "a plurality of" means two or more than two.

An embodiment of the present invention provides an icon display method. One or more target icons (which may be an application (such as WeChat or Camera) icon, a widget (such as Time. Weather, News, or Gallery) icon, a floating icon (such as assistive touch), a folder icon, a function button (such as a virtual navigation button or a play control button) icon, a password input screen, or the like) may be hidden on a touchscreen when the one or more target icons do not need to be displayed. In this case, a screen displayed on a terminal may become a first screen. assistive touch is an existing technology. This button may be used to replace a home button. For example, a user can double tap this button to view a background, and tap the button again to return to a home screen. The button may also be used to control a mobile phone to invoke various functions such as screenshot, power-off, screen lock, volume adjustment, and shake, and also invoke a screen, for example, calling a notification center, Siri, a control center, or the like. Further, a gesture may be used by using this button.

When a finger of the user approaches a position above the touchscreen, the terminal may detect a first gesture of the user that hovers over the touchscreen, and the terminal may be further triggered to display the hidden target icon in a corresponding position on the touchscreen. In this case, a screen that includes the target icon and that is displayed on the terminal may be referred to as a second screen.

The touchscreen is an apparatus, on the terminal device, that has a touch input function and that can perform displaying, and a display screen is a screen displayed in an area in which displaying can be performed on the touchscreen. The touchscreen usually includes a display area and a non-display area. Alternatively, the entire touchscreen may be a display area. When the touchscreen includes a display area and a non-display area, a display range of the first screen and that of the second screen are less than a size of the touchscreen. When the entire touchscreen is a display area, a display range of the first screen and that of the second screen are the same as a size of the touchscreen.

In this case, when the target icon is hidden, the terminal may display, by using display space originally occupied by the target icon, information currently viewed by the user, for example, a video that is being played. However, when the user approaches a position above the touchscreen to trigger the first gesture, it indicates that a focus of the user has been transferred, and a corresponding function of the target icon needs to be triggered in the position. In this case, the terminal may display the target icon in the position on the touchscreen. In this way, the user can find and trigger the target icon in a timely manner by performing only one touch operation. In addition, according to the icon display method provided in this embodiment of the present invention, a corresponding target icon can be displayed in a corresponding position as required by the user. This prevents the target icon from always occupying display space or shielding displayed content viewed by the user currently, to enable the user to obtain immersive user experience.

Further, after the terminal displays the hidden target icon on the touchscreen, if the user does not trigger a related operation on the target icon within a specified time or it is detected that a time in which the finger of the user hovers over the touchscreen is greater than a preset threshold (for example, greater than 3 seconds), it indicates that the user does not need to perform a related function of the target icon at this time. In this case, the terminal may continue to hide the target icon, to prevent the target icon from occupying display space or shielding displayed content viewed by the user currently.

Figure 6:
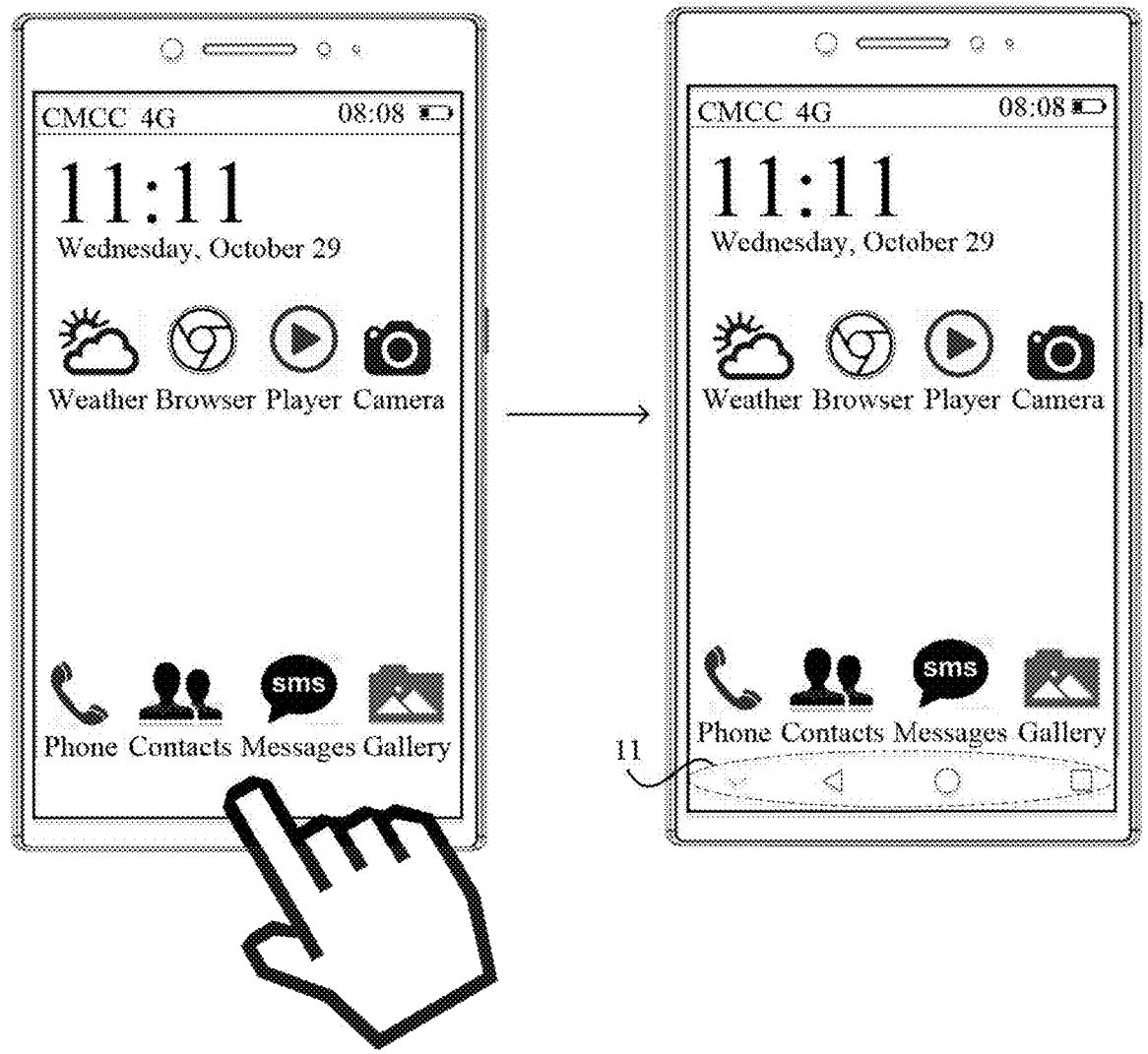
FIG. 6 is a schematic diagram 2 of a scenario of an icon display method according to an embodiment of the present invention.

In a possible implementation, as shown in FIG. 6, an example in which an icon 11 in a navigation bar is used as the target icon is used. As shown in the left figure in FIG. 6, the terminal may display the first screen on the touchscreen. In this case, the first screen does not include the navigation-bar icon 11. When detecting the first gesture that hovers in a first position above the touchscreen, as shown in the right figure in FIG. 6, the terminal may display the second screen including the navigation-bar icon 11, to help the user find and trigger the target icon in a timely manner.

Figure 7:
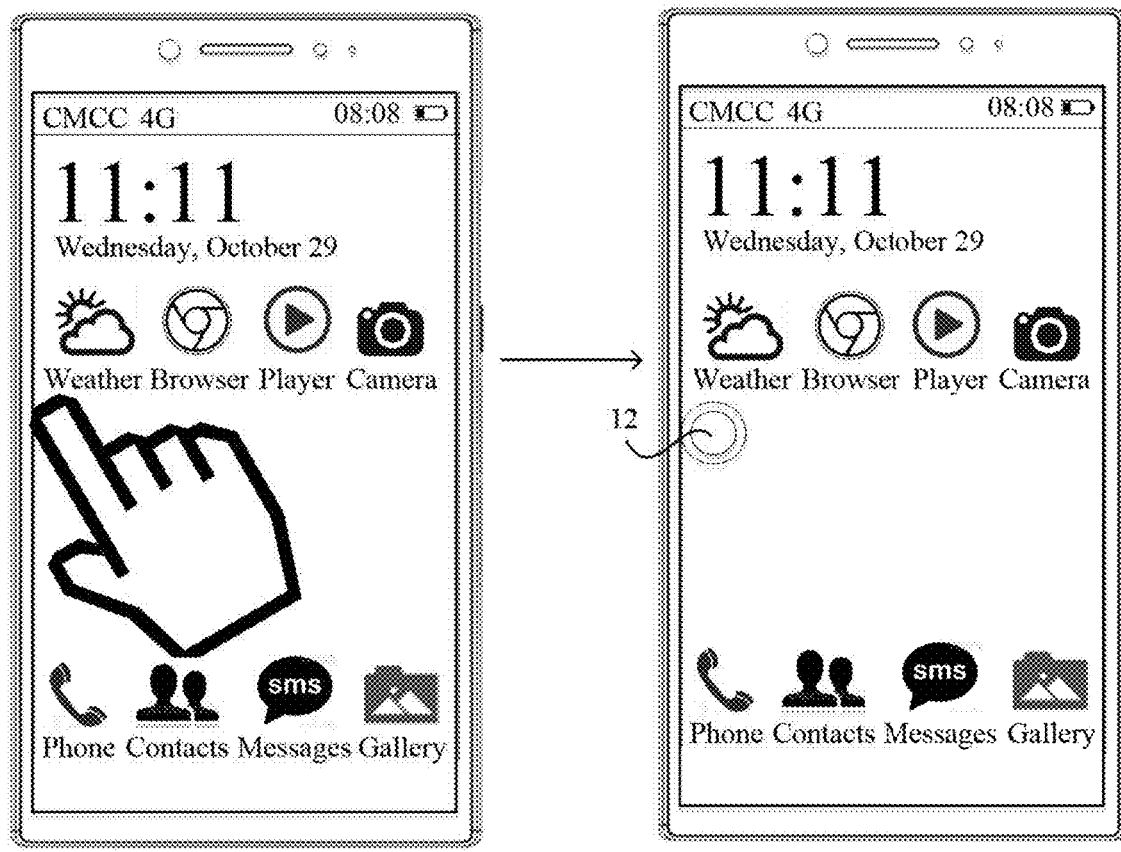
FIG. 7 is a schematic diagram 3 of a scenario of an icon display method according to an embodiment of the present invention.

Further, as shown in FIG. 7, an example in which an assistive touch icon 12 is used as the target icon is used. On the second screen, the assistive touch icon 12 is displayed in a second position, and the second position coincides with a projection that is of the first position and is on the touchscreen. In this way, the user can complete displaying and triggering of the target icon by performing only one touch operation. This avoids a process of searching for the target icon by the user, and improves man-machine interaction intelligence.

Alternatively, the terminal may switch from the displayed first screen to the second screen in response to the detected first gesture. In this case, on the second screen, the target icon is displayed in a target area on the touchscreen. The target area is an area, on the touchscreen, from which a distance to the first position meets a preset condition. For example, the target area is an area in which the user can perform a one-hand operation, to help the user implement a one-hand operation.

Optionally, when displaying the target icon, the terminal may adjust, based on a distance between the finger of the user and the touchscreen, at least one of a size, transparency, color, and display frequency for displaying the target icon, so that an adjusted parameter corresponds to the detected distance between the finger of the user and the touchscreen, to prompt the user to tap the target icon.

In addition, if the terminal is in a screen-off state when detecting the first gesture, the target icon displayed on the second screen is an icon corresponding to the first position in a screen-on state. As shown in (a) in FIG. 12, a password input screen is displayed in a target area 1 in a screen-on state. In this case, if the terminal detects, in a screen-off state, that the user triggers the first gesture in the target area 1, the password input screen is displayed. Correspondingly, as shown in (b) in FIG. 12, a clock icon is displayed in a target area 2 in a screen-on state. In this case, if the terminal detects, in a screen-off state, that the user triggers the first gesture in the target area 2, the clock icon is displayed.

Figure 8:
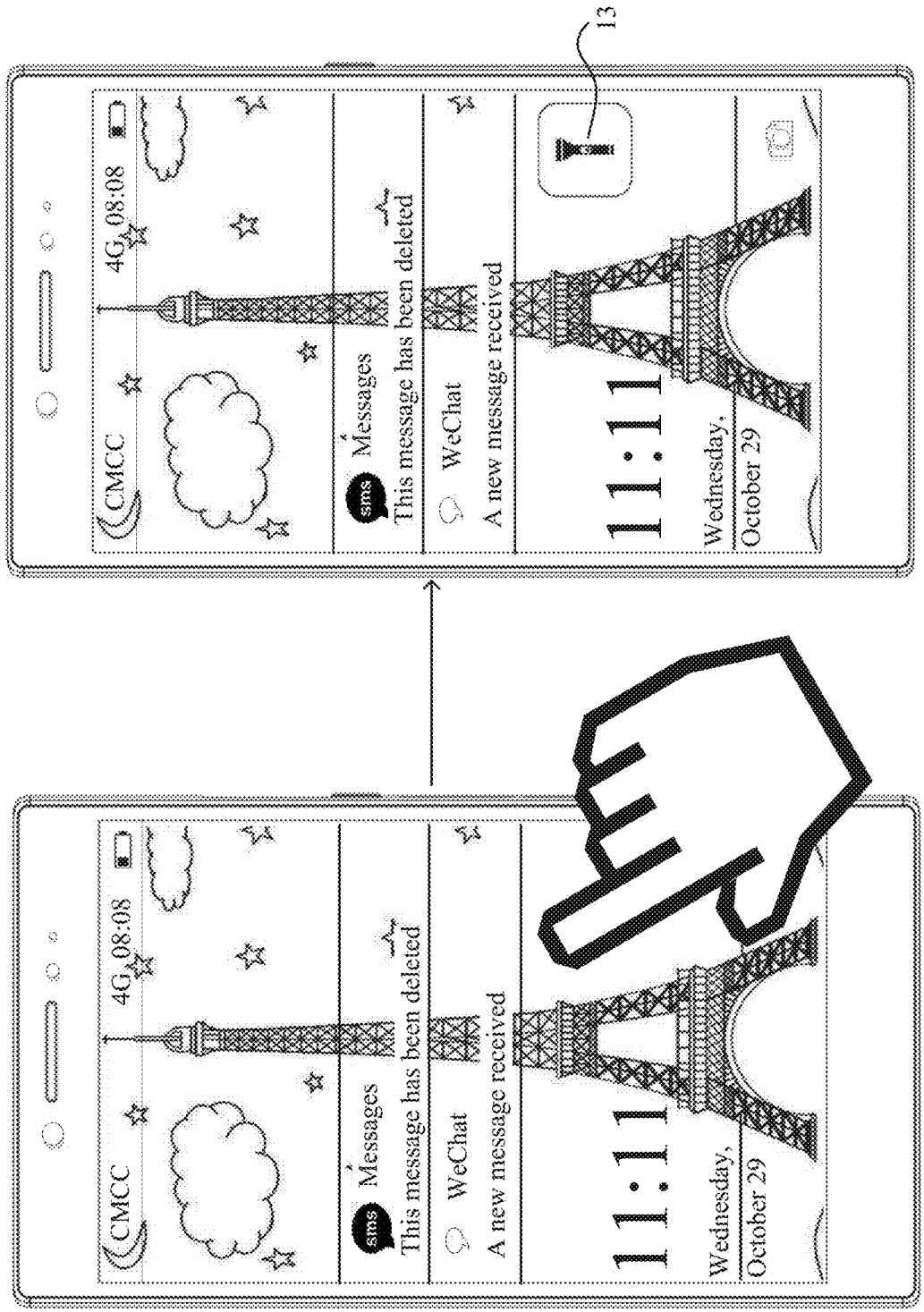
FIG. 8 is a schematic diagram 4 of a scenario of an icon display method according to an embodiment of the present invention.

In another possible implementation, as shown in the left figure in FIG. 8, the first screen displayed on the terminal is a lock screen (this solution may also be used for an unlocked screen). In this case, one or more applications may run on the background of the terminal. For example, a flashlight application is running on the background, but the first screen does not include an icon corresponding to the flashlight application that is currently running on the background. When detecting the first gesture that hovers in a first position above the touchscreen, as shown in the right figure in FIG. 8, the terminal may switch from the displayed first screen to the second screen. The icon of the flashlight application (namely, the target icon) is displayed on the second screen.

Figure 11:
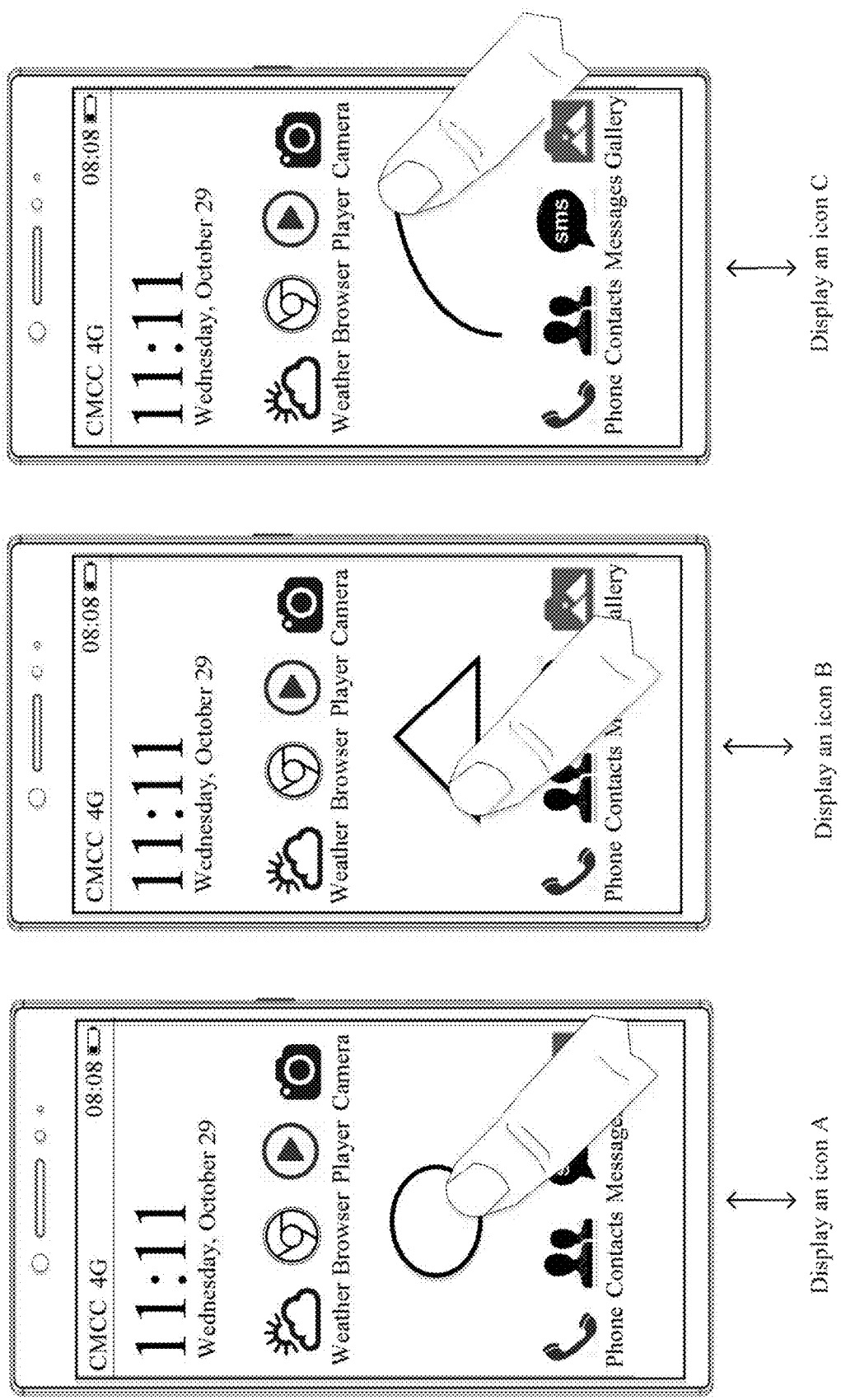
FIG. 11 is a schematic diagram 7 of a scenario of an icon display method according to an embodiment of the present invention.

In addition, as shown in FIG. 11, a correspondence between different first gestures and different target icons may be further stored in the terminal. In this case, the terminal may use, based on the correspondence, an icon corresponding to the detected first gesture as the target icon.

Figure 9:
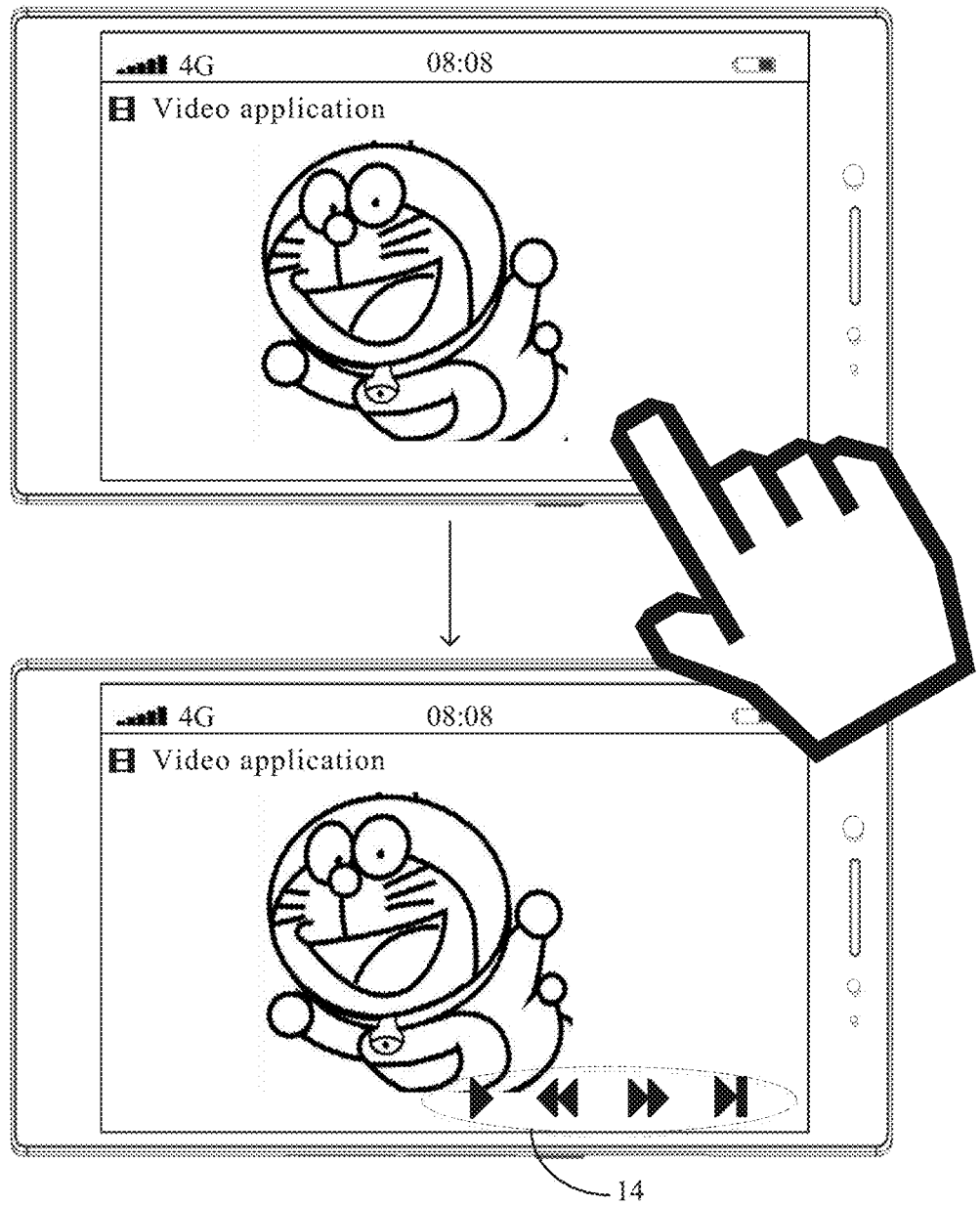
FIG. 9 is a schematic diagram 5 of a scenario of an icon display method according to an embodiment of the present invention.

Alternatively, after detecting the first gesture, the terminal may further use an icon corresponding to a current application scenario as the target icon. For example, as shown in FIG. 9, the current application scenario is a video play scenario. In this case, after detecting the first gesture, the terminal may use an icon 14 of a play button or the like required during video play as the target icon, and display the target icon on the second screen. A correspondence between an application scenario and a target icon may be stored in the terminal and may also be edited by the user.

Optionally, when switching from the displayed first screen to the second screen including the target icon, the terminal may display the target icon in a target area on the touchscreen. The target area is an area, on the touchscreen, from which a distance to the first position meets a preset condition, for example, an area in which the user can perform a one-hand operation on the touchscreen, to help the user implement a one-hand operation.

Alternatively, when switching from the displayed first screen to the second screen including the target icon, the terminal may display the target icon in a preset position. No limitation is imposed in this embodiment of the present invention.

In addition, the icon display method provided in this embodiment of the present invention may be applied to any terminal such as a mobile phone, a wearable device, an AR (augmented reality)/VR (virtual reality) device, a tablet computer, a notebook computer, a UMPC (ultra-mobile personal computer), a netbook, or a PDA (personal digital assistant). No limitation is imposed in this embodiment of the present invention.

Figure 2:
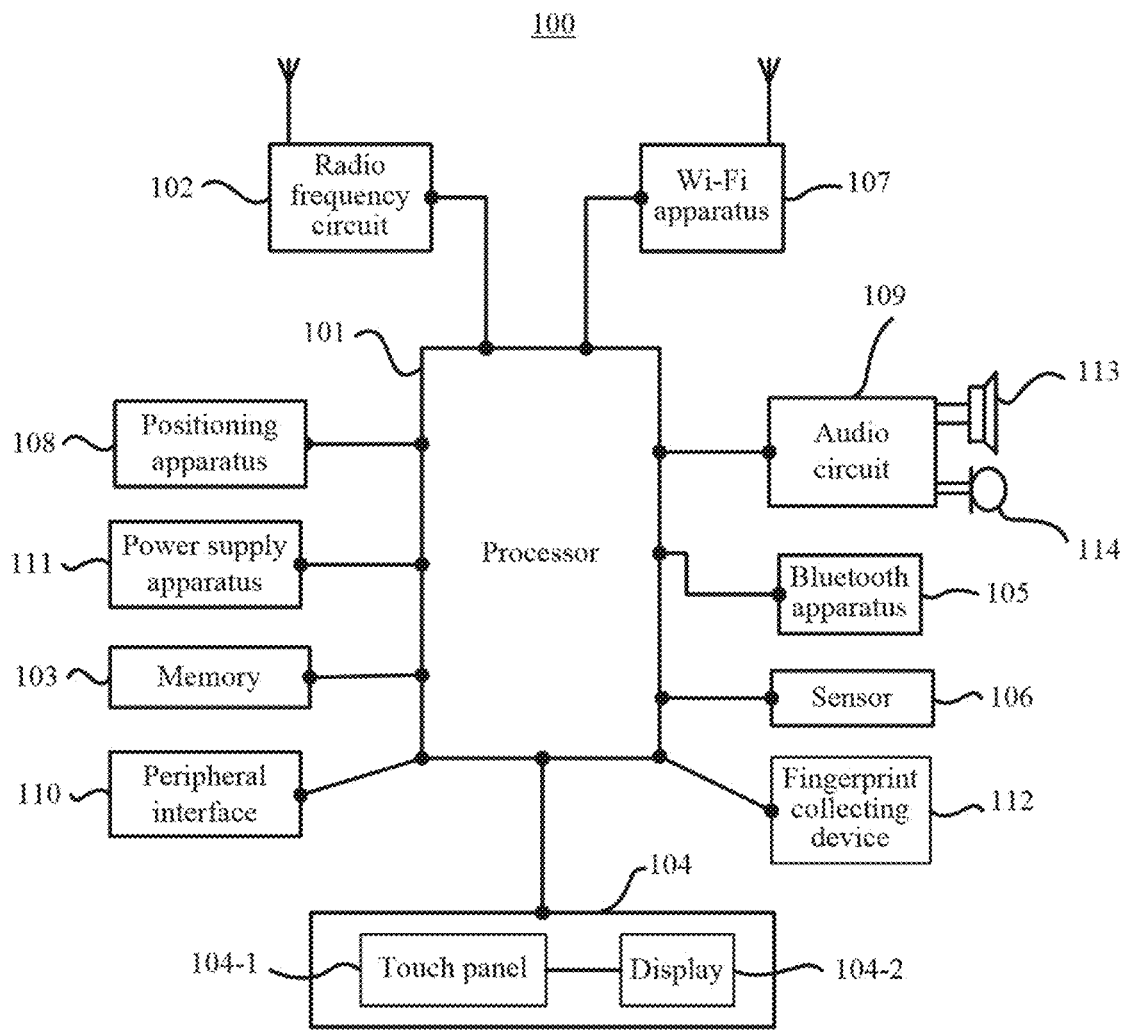
FIG. 2 is a schematic structural diagram 1 of a terminal according to an embodiment of the present invention.

As shown in FIG. 2, the terminal in this embodiment of this application may be a mobile phone 100. The following describes this embodiment in detail by using the mobile phone 100 as an example. It should be understood that the mobile phone 100 in the figure is merely an example of the terminal, and the mobile phone 100 may include more or fewer components than those shown in the figure, may combine two or more components, or may have different component arrangements.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal buses (not shown in FIG. 2). A person skilled in the art can understand that the hardware structure shown in FIG. 2 constitutes no limitation on the mobile phone, and the mobile phone 100 may include more or fewer components than those shown in the figure, combine some components, or have different component arrangements.

The following describes each component of the mobile phone 100 in detail with reference to FIG. 2.

The processor 101 is a control center of the mobile phone 100, and connects to various components of the mobile phone 100 by using various interfaces and lines. The processor 101 performs various functions of the mobile phone 100 and processes data by running or executing an application (referred to as app for short below) stored in the memory 103 and invoking data stored in the memory 103. In some embodiments, the processor 101 may include one or more processing units. For example, the processor 101 may be a Kirin 960 chip made by Huawei Technologies Co., Ltd.

The radio frequency circuit 102 may be configured to receive or send a radio signal during information receiving or sending or during a call. Particularly, the radio frequency circuit 102 may receive downlink data of a base station and then send the downlink data to the processor 101 for processing; and in addition, send related uplink data to the base station. The radio frequency circuit usually includes but is not limited to an antenna, at least one amplifier, a transceiver, a coupler, a low noise amplifier, or a duplexer. In addition, the radio frequency circuit 102 may further communicate with another device through wireless communication. Any communication standard or protocol may be used during wireless communication, including but not limited to Global System for Mobile Communications, general packet radio service, Code Division Multiple Access, Wideband Code Division Multiple Access, Long Term Evolution, an email, or a short message service.

The memory 103 is configured to store an application and data. The processor 101 performs various functions of the mobile phone 100 and processes data by running the application and data that are stored in the memory 103. The memory 103 mainly includes a program storage area and a data storage area. The program storage area may store an operating system and an application required by at least one function (such as a sound play function or an image play function). The data storage area may store data (such as audio data or a phone book) created during use of the mobile phone 100. In addition, the memory 103 may include a high-speed random access memory, and may further include a non-volatile memory such as a magnetic disk storage device, a flash memory device, or another volatile solid-state storage device. The memory 103 may store various operating systems including an iOS operating system developed by Apple an Android operating system developed by Google Inc., and other operating systems.

The touchscreen 104 may include a touch panel 104-1 and a display 104-2. The touch panel 104-1 may collect a touch event (such as an operation performed by a user of the mobile phone 100 on or near the touch panel 104-1 by using any proper object such as a finger or a stylus) performed by the user on or near the touch panel 104-1, and send collected touch information to another component such as the processor 101.

The touch event performed by the user near the touch panel 104-1 may be referred to as a floating touch. The floating touch may mean that the user does not need to directly touch the touch panel to select, move, or drag a target (such an icon), and the user only needs to be near the terminal to execute a desired function. In an application scenario of the floating touch, terms such as "touch" and "contact" do not imply direct touch the touchscreen, but to be near or close to the touchscreen.

Figure 3:
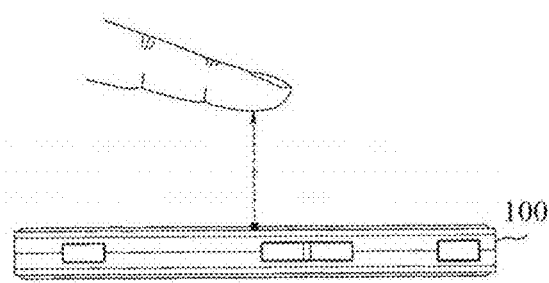
FIG. 3 is a schematic diagram of a floating touch application scenario according to an embodiment of the present invention.

Specifically, two types of capacitance sensors that are a mutual-capacitance sensor and a self-capacitance sensor may be disposed in the touch panel 104-1. The two types of capacitance sensors may be arranged on the touch panel 104-1 alternately. The mutual-capacitance sensor is configured to implement normal conventional multi-point touch, that is, detect a gesture performed when the user touches the touch panel 104-1. The self-capacitance sensor can generate a signal stronger than that generated by mutual capacitance sensor, to detect finger sensing farther away from the touch panel 104-1. Therefore, when a finger of the user hovers over a screen, as shown in FIG. 3, because a signal generated by the self-capacitance sensor is stronger than a signal generated by the mutual-capacitance sensor, the mobile phone 100 can detect a gesture of the user above the screen, for example, in a position 20 mm above the touch panel 104-1.

Optionally, the touch panel 104-1 that can support the floating touch may be implemented in a capacitive, infrared light sensing, or ultrasonic wave manner, or the like. In addition, the touch panel 104-1 may be implemented by using a plurality of types such as a resistive type, a capacitive type, an infrared type, and a surface acoustic wave type. The display (also referred to as a display screen) 104-2 may be configured to display information entered by the user or information provided for the user, and various menus of the mobile phone 100. The display 104-2 may be disposed in a form such as a liquid crystal display or an organic light-emitting diode. The touch panel 104-1 may cover the display 104-2. After detecting a touch event on or near the touch panel 104-1, the touch panel 104-1 transfers the touch event to the processor 101 to determine a type of the touch event, and then the processor 101 can provide corresponding visual output on the display 104-2 based on the type of the touch event. In FIG. 2, the touch panel 104-1 and the display screen 104-2 are used as two independent components to implement input and output functions of the mobile phone 100. However, in some embodiments, the touch panel 104-1 and the display screen 104-2 may be integrated to implement the input and output functions of the mobile phone 100. It can be understood that the touchscreen 104 is formed by stacking a plurality of layers of materials. Only the touch panel (layer) and the display screen (layer) are displayed in this embodiment of this application, and other layers are not recorded in this embodiment of this application. In addition, in other embodiments of this application, the touch panel 104-1 may cover the display 104-2, and a size of the touch panel 104-1 is greater than that of the display screen 104-2, so that the display screen 104-2 is totally covered by the touch panel 104-1. Alternatively, the touch panel 104-1 may be disposed on the front of the mobile phone 100 in a full-panel form, that is, any touch of the user on the front of the mobile phone 100 can be sensed by the mobile phone, so that full-touch experience on the front of the mobile phone can be achieved. In other embodiments, the touch panel 104-1 is disposed on the front of the mobile phone 100 in a full-panel form, and the display screen 104-2 may also be disposed on the front of the mobile phone 100 in a full-panel form. In this way, a bezel-less structure can be implemented on the front of the mobile phone.

In the embodiments of this application, the mobile phone 100 may further have a fingerprint recognition function. For example, a fingerprint recognizer 112 is disposed on the back of the mobile phone 100 (for example, below a rear-facing camera), or a fingerprint recognizer 112 is disposed on the front of the mobile phone 100 (for example, below the touchscreen 104). For another example, the fingerprint recognition function may be implemented by disposing a fingerprint collecting device 112 in the touchscreen 104. That is, the fingerprint collecting device 112 may be integrated into the touchscreen 104 to implement the fingerprint recognition function of the mobile phone 100. In this case, the fingerprint collecting device 112 is disposed in the touchscreen 104 and may be a part of the touchscreen 104, or may be disposed in the touchscreen 104 in another manner. In addition, the fingerprint collecting device 112 may be further implemented as a hall panel fingerprint collecting device. Therefore, the touchscreen 104 may be considered as a panel on which a fingerprint can be recognized in any position. The fingerprint collecting device 112 may send the collected fingerprint to the processor 101, so that the processor 101 processes the fingerprint (for example, fingerprint verification). A main component of the fingerprint collecting device 112 in this embodiment of this application is a fingerprint sensor. The fingerprint sensor may use any type of sensing technology, including but not limited to an optical technology, a capacitive technology, a piezoelectric technology, or an acoustic wave sensing technology.

The mobile phone 100 may further include the Bluetooth apparatus 105 configured to exchange data between the mobile phone 100 and another short-distance terminal (for example, a mobile phone or a smartwatch). The Bluetooth apparatus in this embodiment of this application may be an integrated circuit, a. Bluetooth chip, or the like.

The mobile phone 100 may further include at least one sensor 106 such as a light sensor or a motion sensor. Specifically, the light sensor may include an ambient light sensor and a proximity sensor. The ambient light sensor can adjust luminance of the display of the touchscreen 104 according to brightness of ambient light, and the proximity sensor can power off the display when the mobile phone 100 moves to an ear. As a type of motion sensor, an accelerometer sensor can detect a value of acceleration in all directions (generally, three axes), and can detect a value and a direction of gravity in a static state. The accelerometer sensor can be used in an application for recognizing a posture (such as screen switching between landscape and portrait modes, related games, and magnetometer posture calibration) of the mobile phone, a function related to vibration recognition (such as a pedometer and a knock), and the like. For other sensors such as a gyroscope, a barometer, a hygrometer, a thermometer, and an infrared sensor that may be further disposed on the mobile phone 100, details are not described herein.

The Wi-Fi apparatus 107 is configured to provide, for the mobile phone 100, network access that complies with Wi-Fi related standard protocols. The mobile phone 100 may access a Wi-Fi access point by using the Wi-Fi apparatus 107, to help the user receive or send an email, browse a web page, access streaming media, and the like. The Wi-Fi apparatus provides wireless broadband Internet access for the user. In other embodiments, the Wi-Fi apparatus 107 may be used as a wireless access point and may provide network access for another terminal.

The positioning apparatus 108 is configured to provide a geographic location for the mobile phone 100. It can be understood that the positioning apparatus 108 may be specifically a receiver of a positioning system such as a Global Positioning System (GPS), a Beidou Navigation Satellite System, or Russia GLONASS. After receiving a geographic location sent by the foregoing positioning system, the positioning apparatus 108 sends the information to the processor 101 for processing, or sends the information to the memory 103 for storage. In other embodiments, the positioning apparatus 108 may be a receiver of an Assisted Global Positioning System (AGPS). The AGPS system acts as an assisted server to assist the positioning apparatus 108 in completing ranging and positioning services. In this case, the assisted positioning server communicates with the positioning apparatus 108 (to be specific, a GPS receiver) of the terminal such as the mobile phone 100 by using a wireless communications network, to provide positioning assistance. In other embodiments, the positioning apparatus 108 may be a positioning technology based on a Wi-Fi access point. Each Wi-Fi access point has a globally unique MAC address. The terminal can scan and collect a broadcast signal of a surrounding Wi-Fi access point when Wi-Fi is enabled, therefore can obtain a MAC address broadcast by the Wi-Fi access point. The terminal sends data (such as the MAC address) that can identify the Wi-Fi access point to a location server by using a wireless communications network. The location server retrieves a geographic location of each Wi-Fi access point, calculates a geographic location of the terminal in combination with strength of the broadcast signal of Wi-Fi access point, and sends the geographic location of the terminal to the positioning apparatus 108 of the terminal.

The audio circuit 109, a loudspeaker 113, and a microphone 114 can provide audio interfaces between the user and the mobile phone 100. The audio circuit 109 may transmit, to the loudspeaker 113, an electrical signal obtained by converting received audio data, and the loudspeaker 113 converts the electrical signal into a sound signal for output. In addition, the microphone 114 converts a collected sound signal into an electrical signal, and the audio circuit 109 receives the electrical signal and converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (such as a keyboard, a mouse, an externally connected display, an external memory, or a subscriber identity module card). For example, a universal serial bus (USB) interface is used to connect to a mouse, or a metal touch point on a subscriber identity module card slot is used to connect to a subscriber identity module (SIM) card provided by a telecommunications operator. The peripheral interface 110 may be used to couple the external input/output peripheral device to the processor 101 and the memory 103.

The mobile phone 100 may further include the power supply apparatus 111 (such as a battery or a power management chip) that supplies power to various components. The battery may be logically connected to the processor 101 by using the power management chip, to implement functions such as charging management, discharging management, and power consumption management by using the power supply apparatus 111.

Although not shown in FIG. 2, the mobile phone 100 may further include a camera (a front-facing camera and/or a rear-facing camera), a flashlight, a micro projection apparatus, a near field communication (NFC) apparatus, or the like. Details are not described herein.

Figure 4:
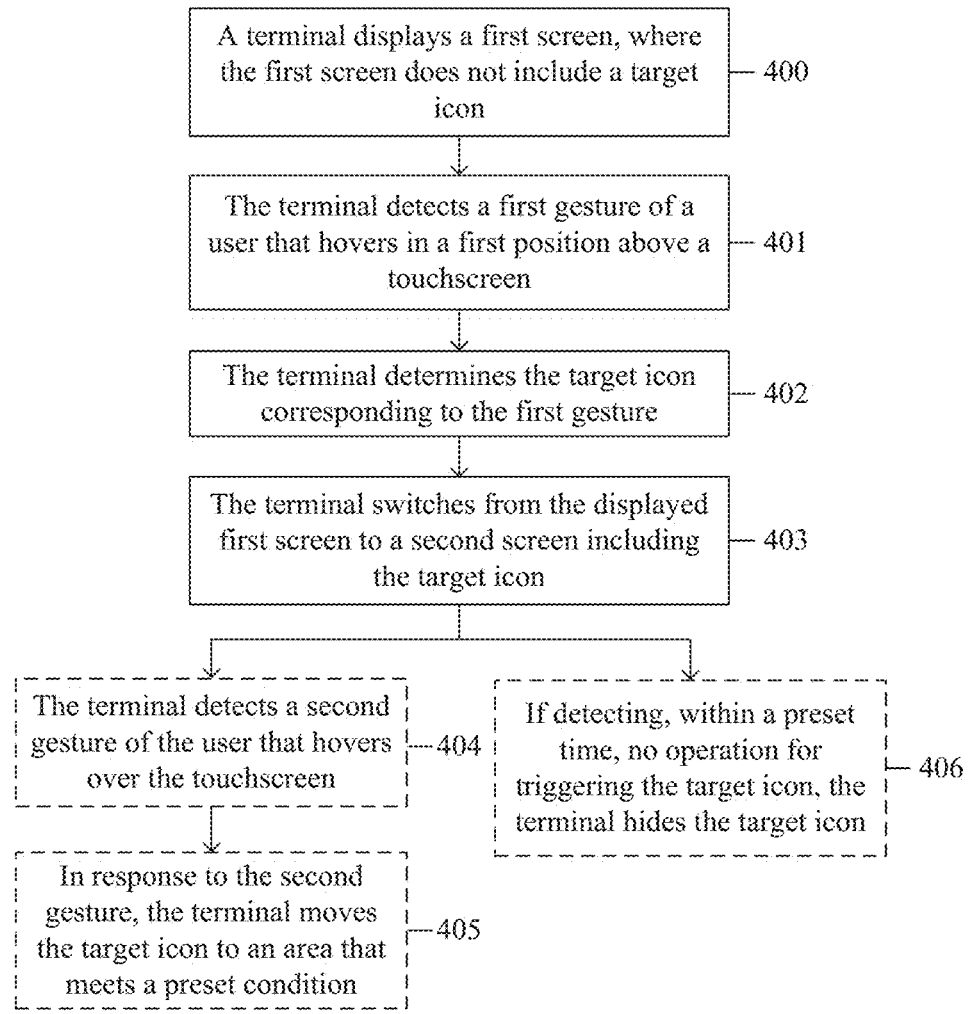
FIG. 4 is a schematic flowchart of an icon display method according to an embodiment of the present invention.

With reference to a specific embodiment, the following describes in detail an icon display method provided in an embodiment of the present invention. As shown in FIG. 4, the method includes the following steps.

400. A terminal displays a first screen, where the first screen does not include a target icon.

That is, the target icon is hidden on the first screen displayed on the terminal. For example, an icon of a navigation button in a navigation bar is hidden, or an icon of a background application is hidden. Certainly, the first screen may alternatively be a screen displayed when the terminal is in a screen-off state. No limitation is imposed in this embodiment of the present invention.

401. The terminal detects a first gesture of a user that hovers in a first position above a touchscreen.

Figure 5:
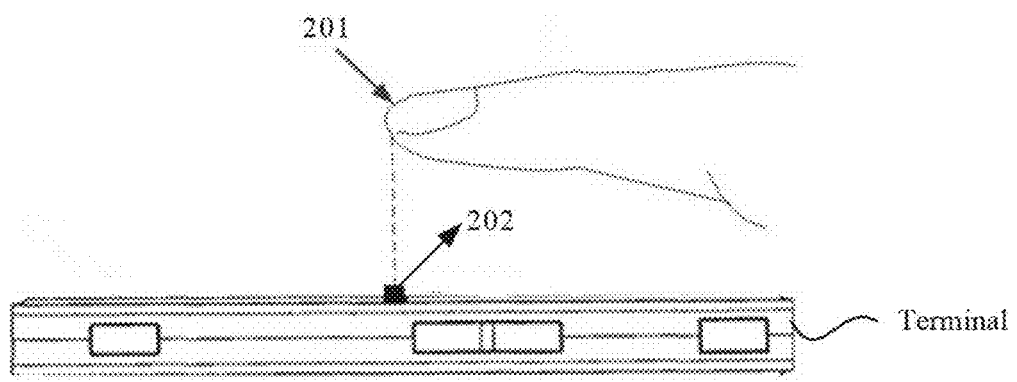
FIG. 5 is a schematic diagram 1 of a scenario of an icon display method according to an embodiment of the present invention.

Specifically, when the terminal enables a floating touch function, the terminal scans, at a specified frequency, a self-capacitance sensor and a mutual-capacitance sensor that are disposed on the touchscreen. As shown in FIG. 5, when a finger or a palm of the user hovers in a position (such as the first position 201) above the touchscreen, due to an effect of the electric field of the human body, a capacitance signal generated by one or more self-capacitance sensors in a second position 202 that is corresponding to the first position 201 and that is on the touchscreen changes. In this case, the terminal can detect, based on the capacitance signal in the second position 202, the first gesture of the user that hovers in the first position. For example, the first gesture may be a tap gesture, a slide gesture, or a gesture in any shape. The touchscreen is not touched when these gestures are performed. No limitation is imposed in this embodiment of the present invention.

In addition, to reduce power consumed when the terminal enables the floating touch function, when the terminal is in a screen-off state, the terminal may scan only the self-capacitance sensor disposed on the touchscreen, and detect, by using the self-capacitance sensor, whether the user intends to touch the touchscreen. After detecting that a distance between the finger of the user and the touchscreen is less than a preset value, the terminal may start to scan the mutual-capacitance sensor, to obtain touch data of the user on the touchscreen in a timely manner.

Alternatively, the terminal may determine, based on data detected by a gyroscope and an acceleration sensor of the terminal, whether the terminal is lifted. When the terminal is lifted, it indicates that the user needs to use the terminal. In this case, a frequency of scanning the self-capacitance sensor by the terminal may be increased. When the terminal is not lifted, a frequency of scanning the self-capacitance sensor may be reduced, thereby reducing power consumed when the terminal enables the floating touch function.

Alternatively, when a light sensor is disposed in the terminal, the terminal may determine, based on a current ambient-light strength detected by the light sensor, whether the terminal is placed in a pocket or backpack. If determining that the terminal is currently placed in the pocket or backpack, the terminal may disable the floating touch function or reduce a frequency of scanning the self-capacitance sensor, to reduce power consumed when the terminal enables the floating touch function.

402. The terminal determines the target icon corresponding to the first gesture.

403. The terminal switches from the displayed first screen to a second screen including the target icon.

A second position for displaying the target icon on the second screen may coincide with a projection that is of the first position and is on the touchscreen.

Alternatively, the target icon on the second screen may be displayed in a target area on the touchscreen. The target area is an area, on the touchscreen, from which a distance to the first position meets a preset condition. For example, to meet a requirement that the user can perform a one-hand operation, a finger length of the user may be determined based on the first gesture, and a feasible target area is determined based on an area that the length can reach. Alternatively, a feasible target area may be determined based on a preset radius by using the center of a projection position of the first gesture on the touchscreen as a center of a circle. After the feasible target area is determined, an idle position is determined in this area, namely, a position in which there are no other operations, function elements, key display elements, or the like, and the position is used as a target display position to place the target icon.

For example, as shown in FIG. 6, in steps 402 and 403, after the terminal detects the first gesture of the user that hovers over the touchscreen, if determining that the target icon corresponding to the first gesture is a navigation-bar icon 11, the terminal may display the navigation-bar icon 11 on the touchscreen. In this case, when the user is ready to touch the touchscreen but does not touch the touchscreen yet, the terminal can display the hidden navigation-bar icon 11, so that the user can quickly trigger a corresponding function of the navigation-bar icon 11. In addition, before the navigation-bar icon 11 is displayed, the icon 11 does not occupy display space on the touchscreen or interfere with an operation that is being performed on the touchscreen.

Alternatively, as shown in FIG. 7, after the terminal detects the first gesture of the user that hovers over the touchscreen, if determining that the target icon corresponding to the first gesture is an assistive touch icon 12, the terminal may display the assistive touch icon 12 on the touchscreen, for example, display the icon in a position that is corresponding to the first gesture and is on the touchscreen. In this way, in a process in which the finger of the user gradually approaches the touchscreen, the assistive touch icon 12 is gradually displayed in a position that is corresponding to the finger of the user and is on the touchscreen. When the finger of the user touches the touchscreen, the assistive touch icon 12 can be quickly and accurately touched, so that an entire target-icon triggering process is smooth and fast, and other information that is being displayed on the terminal is not affected before the target icon is displayed.

In a possible design manner, after detecting the first gesture of the user that hovers over the touchscreen, the terminal may further obtain current scenario description data. The scenario description data is used to indicate a current application scenario of the terminal, for example, the terminal is in a screen-off state, an application A is running on the background of the terminal, or the terminal is in a running mode. In this way, the terminal may determine, based on the scenario description data, a specific target icon corresponding to the first gesture.

For example, the scenario description data may specifically include a running status of the terminal, and/or data about an application that is running on the terminal. As shown in FIG. 8, when detecting the first gesture, the terminal may determine, based on the data about the application that is running on the terminal, that a flashlight application is running on the background of the terminal. In this case, to help the user disable the flashlight application, an icon 13 of the flashlight application may be used as the target icon, and the icon 13 is displayed on a current display screen.

Alternatively, as shown in FIG. 9, a video application is running on the terminal. To ensure that the user can focus on a video that is being played, an operation icon such as Pause, Fast-forward, Rewind, and Next on a display screen may be hidden. In this case, when the first gesture triggered by the user through floating touch is detected, it indicates that attention of the user has been transferred from the played video, and a related operation may need to be performed on the currently played video. Therefore, as shown in FIG. 9, the operation icon 14 such as Pause, Fast-forward, Rewind, and Next may be used as the target icon, and the icon 14 is further displayed on the current display screen.

Figure 10:
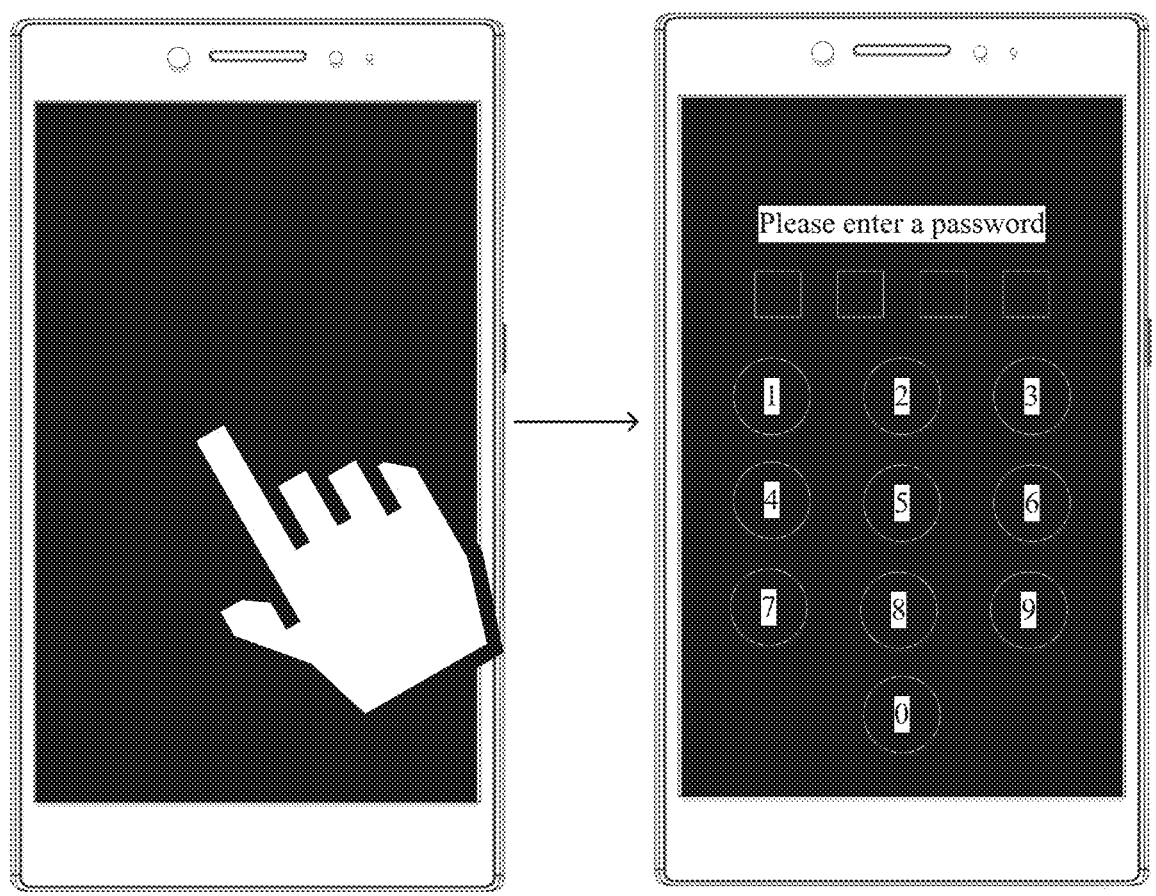
FIG. 10 is a schematic diagram 6 of a scenario of an icon display method according to an embodiment of the present invention.

Alternatively, as shown in FIG. 10, the terminal is in a screen-off state. In this case, when the first gesture triggered by the user through floating touch is detected, it indicates that the user currently has a requirement of using the terminal. However, a screen of the terminal has been locked currently. Therefore, the user needs to first unlock the screen to perform another operation on the terminal. In this case, as shown in FIG. 10, the terminal may use a related icon of an unlock function as the target icon, and then display the target icon. In this way, in a screen-off state, the terminal can catch an unlock intention of the user quickly, and present the unlock icon to the user, so that the user can quickly unlock the screen of the terminal and power consumption of the terminal is reduced. Alternatively, the terminal is in a screen-off state and a sports application on the terminal is running on the background. In this case, when the first gesture triggered by the user through floating touch is detected, data and/or a state monitored by the current sports application may be directly displayed on the unlit screen. Different content such as a time screen, a weather screen, and a password input screen may also be displayed based on different positions to which the first gesture of the user is applied above the touchscreen, so that the user can quickly browse some non-confidential or non-private content without performing unlocking or touching a physical button or the screen. It is convenient for the user to obtain information when it is inconvenient to operate the touchscreen or the button (for example, the user cannot see the terminal and/or a button position clearly due to light or vision, or the user cannot free a hand or there is water on the hand).

It can be learned that the terminal may determine, by using the scenario description data, a related function that the user needs to use in a current application scenario. In this case, when the terminal detects the first gesture, before the finger of the user really touches the touchscreen, the terminal may display an icon of the function in a position that the user is ready to touch on the touchscreen or in which the user can perform a one-hand operation, to help the user perform a corresponding operation. In addition, before the first gesture is detected, the icon of the function does not occupy display space or interfere with a related operation that is being performed by the terminal.

In another possible design manner, the terminal may prestore a correspondence between different gestures and different icons in a floating touch scenario. As shown in FIG. 11, when the first gesture is in a shape of an ellipse, an icon corresponding to the first gesture is an icon A; when the first gesture is in a shape of a triangle, an icon corresponding to the first gesture is an icon B; or when the first gesture is in a shape of an arc, an icon corresponding to the first gesture is an icon C. In this case, after detecting the first gesture of the user that hovers over the touchscreen, the terminal may determine, based on the correspondence, a target icon corresponding to the current first gesture, and further display the target icon on the touchscreen.

Alternatively, different target areas may be set on the touchscreen, and the different target areas correspond to different target icons. In this case, when detecting that the finger of the user hovers over a target area 1, the terminal may be triggered to display a target icon 1 corresponding to the target area 1.

Figure 12A:
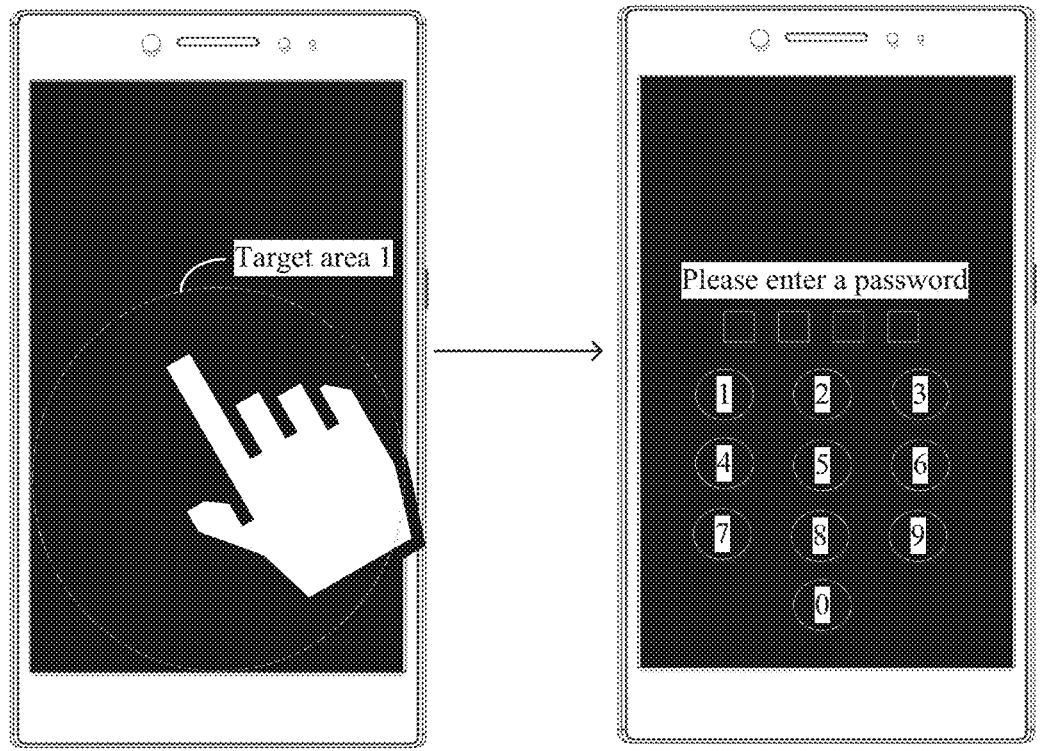
FIG. 12(a) and FIG. 12(b) are a schematic diagram 8 of a scenario of an icon display method according to an embodiment of the present invention.
Figure 12B:
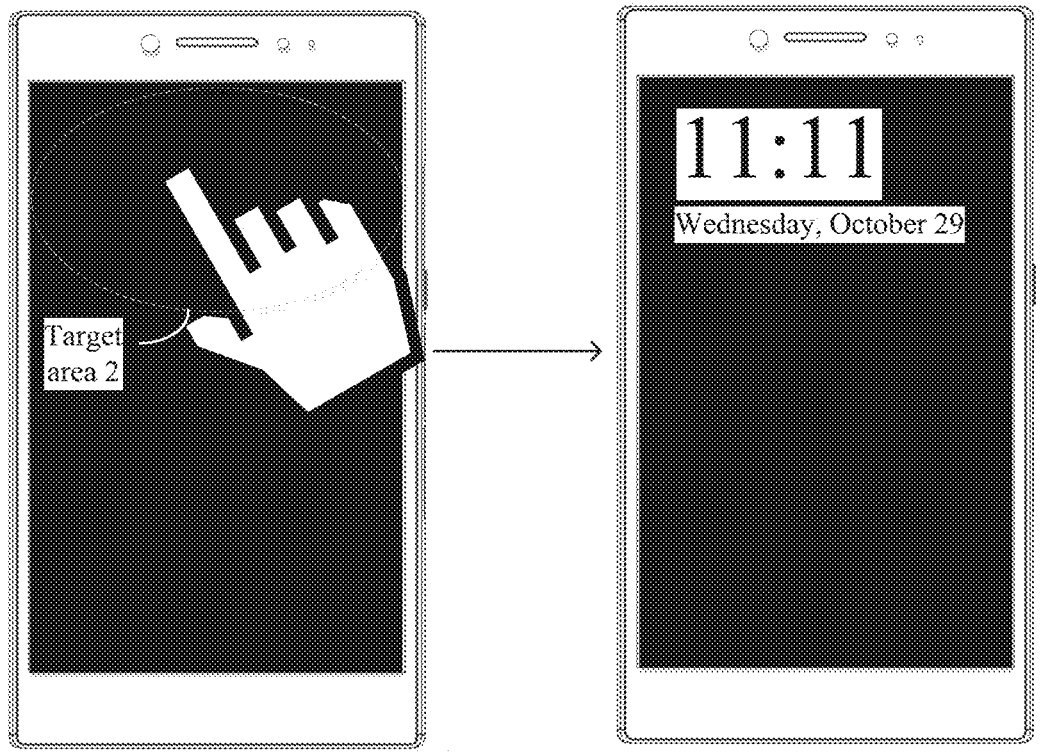

As shown in (a) in FIG. 12, an unlock icon is usually displayed in the target area 1 during unlocking. Therefore, in a screen-off state, when the finger of the user hovers over any position in the target area 1, the terminal may be triggered to display the unlock icon, for example, a pattern unlock icon or a password unlock icon. As shown in (b) in FIG. 12, a clock icon is usually displayed in a target area 2 in a screen-on state. Therefore, in a screen-off state, when the finger of the user hovers over any position in the target area 2, the terminal may be triggered to display the clock icon.

For a same target area, the terminal may be triggered to display different target icons in different application scenarios. For example, as shown in (a) in FIG. 13, when the user is running while holding the terminal, the terminal may detect that a current scenario is a sports scenario. In this case, if the finger of the user hovers over any position in a target area 2 in a screen-off state, the terminal may be triggered to display currently recorded sports data such as a step quantity or a heart rate. When the terminal detects a hand raise operation of the user, as shown in (b) in FIG. 13, if the finger of the user hovers over any position in a target area 2 in a screen-off state, the terminal may be triggered to display a clock icon.

In addition, still as shown in FIG. 5, a projection, on the touchscreen, of the first position 201 in which the finger of the user hovers coincides with a second position 202 in which the target icon is displayed on the touchscreen. That is, the terminal may pre-determine that a touch position of the finger of the user on the touchscreen is the second position 202. In this case, in a process in which the finger of the user approaches the touchscreen, the terminal may display the target icon in the second position 202 in advance. In this way, the user can complete displaying and triggering of the target icon by performing only one touch operation. This avoids a process of searching for the target icon by the user, and improves man-machine interaction intelligence.

For example, when displaying the target icon, the terminal may further adjust, in real time based on a distance between the finger of the user and the touchscreen, a display parameter for displaying the target icon, for example, at least one of a size, transparency, color, and display frequency of the target icon.

For example, when the finger of the user is closer to the touchscreen, the transparency of the target icon may be reduced, the size of the target icon may be increased, or the display frequency of the target icon may be increased, so that the target icon presents a flicker display effect to attract the user's attention. Even when the distance between the linger of the user and the touchscreen reaches a preset condition, for example, is less than a preset distance, an animation effect is started for displaying the target icon, to provide a better prompt for the user.

This embodiment of the present invention may further include the following steps.

404. The terminal detects a second gesture of the user that hovers over the touchscreen.

405. In response to the second gesture, the terminal moves the target icon to an area that meets a preset condition.

For example, the area that meets the preset condition is an area in which the user can perform a one-hand operation on the touchscreen.

In step 404, after the terminal displays the target icon on the touchscreen, the terminal may further detect the second gesture of the user that hovers over the touchscreen. The second gesture may be a tap gesture, a slide gesture, or a gesture in any shape, No limitation is imposed in this embodiment of the present invention.

Figure 14:
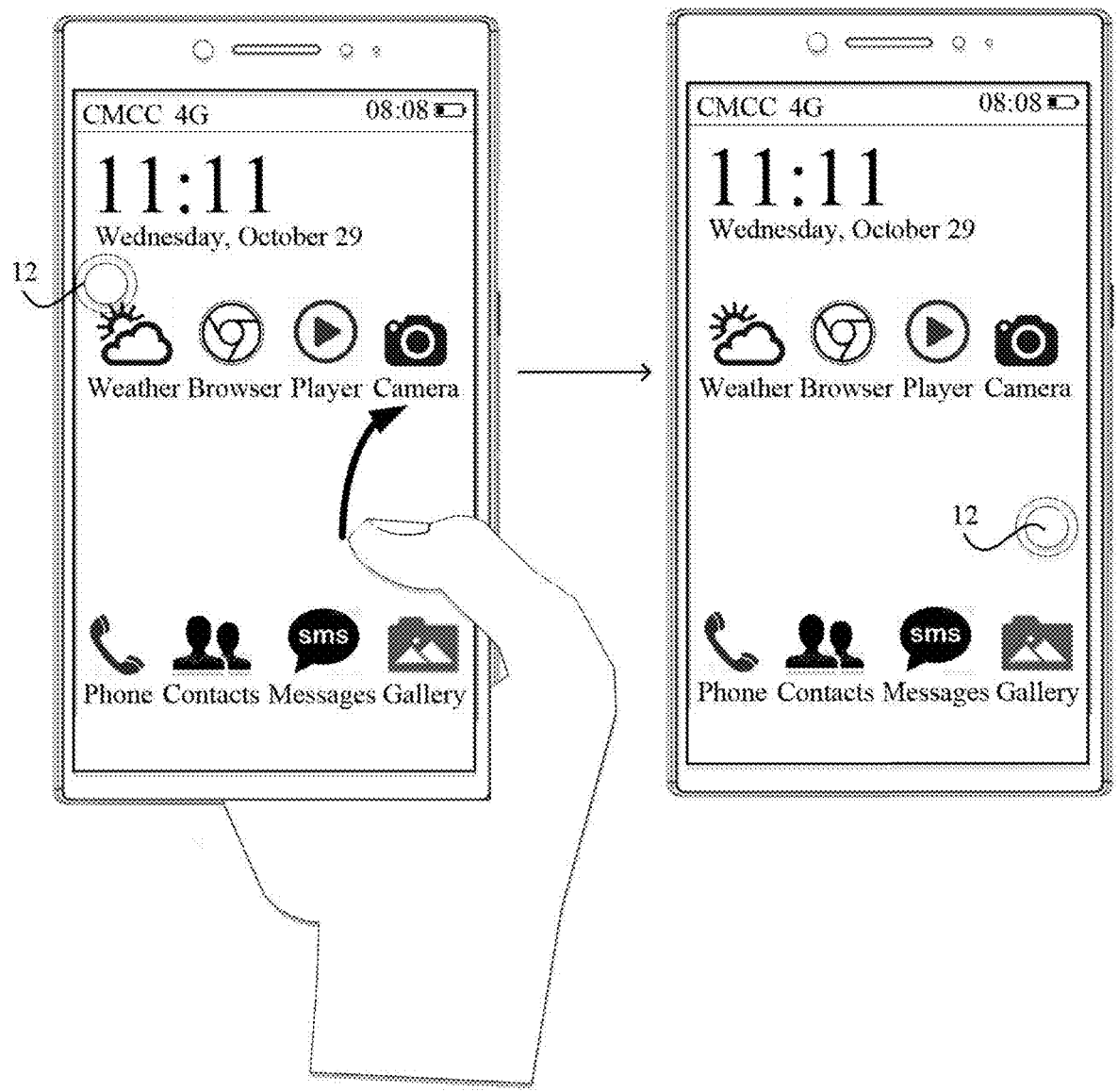
FIG. 14 is a schematic diagram 10 of a scenario of an icon display method according to an embodiment of the present invention.

As shown in FIG. 14, the terminal displays the target icon (for example, an assistive touch icon 12) on an upper left corner of the screen, and the user cannot touch the icon 12 when using the right hand to perform a one-hand operation. In this case, the user may trigger the second gesture on the touchscreen through floating touch. In step 405, after detecting the second gesture, the terminal may move the icon 12 to an area (namely, the area that meets the preset condition) in which the user can perform a one-hand operation on the touchscreen, for example, an area on a lower right corner of the touchscreen, to help the user implement a one-hand operation.

406. If detecting, within a preset time, no operation for triggering the target icon, the terminal hides the target icon.

After the terminal displays the target icon on the touchscreen, if no operation such as a tap operation, a double-tap operation, or a touch and hold operation for triggering the target icon by the user is detected within the preset time, for example, within 3 seconds, it indicates that the user does not need to perform a function related to the target icon. In this case, the terminal may continue to hide the target icon displayed on the second screen. This prevents the target icon from interfering with an operation that is being performed by the terminal, to enable the user to obtain immersive user experience.

In addition, when a floating touch function is implemented, the terminal cannot catch an exit event in a timely manner because the finger of the user leaves the touchscreen relatively quickly. To avoid this problem, in this embodiment of the present invention, once detecting that a time in which the finger of the user hovers over the touchscreen is greater than a preset first threshold, or when detecting that a time in which the finger of the user hovers in a position above the touchscreen is greater than a preset second threshold (the second threshold may be the same as or different from the first threshold), the terminal can determine that the finger of the user has left the touchscreen, and then hides the target icon.

It should be noted that no limitation is imposed on a sequence of performing step 406 and steps 404 and 405 in this embodiment of the present invention.

Figure 15:
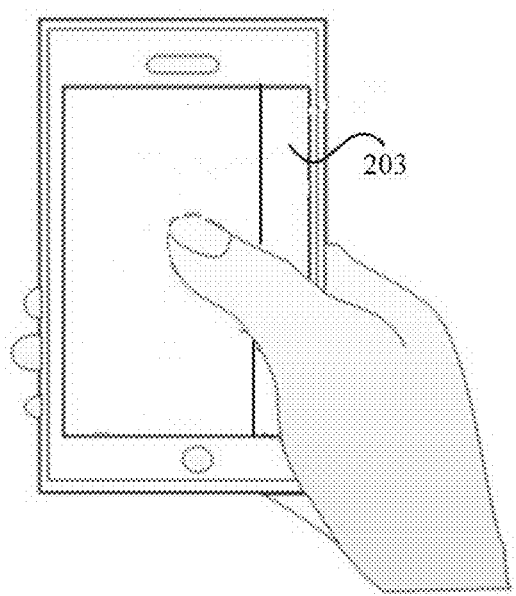
FIG. 15 is a schematic diagram 11 of a scenario of an icon display method according to an embodiment of the present invention.

Further, after the terminal enables the floating touch function, when the user holds the terminal, the finger may hover over an edge of the touchscreen, for example, over an area 203 in FIG. 15. In this case, the self-capacitance sensor at the edge of the touchscreen generates a relatively strong self-capacitance signal, but the capacitance signal is not intentionally triggered by the user by performing floating touch. Consequently, a misjudgment is caused. In view of this, when the terminal detects that the terminal is currently held, several self-capacitance sensors disposed at the edge of the touchscreen may be disabled, for example, in the area 203. This prevents the terminal from mistakenly considering a self-capacitance signal generated at the edge of the touchscreen as a floating touch event triggered by the user.

When detecting a mutual-capacitance signal generated by the mutual-capacitance sensor on the touchscreen, the terminal usually disables the self-capacitance sensor on the touchscreen. That is, a priority of an actual touch event of the user on the touchscreen is higher than that of a floating touch event near the touchscreen. However, when the user holds the terminal, a thenar eminence or another part of the palm may touch the edge area of the touchscreen unintentionally, for example, the area 203 in FIG. 15. In this case, a mutual-capacitance signal is generated at the edge of the touchscreen, and further the terminal is triggered to disable the self-capacitance sensor. As a result, the terminal cannot detect a floating touch event triggered when the finger of the user hovers over the touchscreen. In view of this, in this embodiment of the present invention, when detecting a mutual-capacitance signal generated at the edge of the touchscreen, the terminal is not triggered to disable the self-capacitance sensor on the touchscreen. That is, the self-capacitance sensor can still work normally, to reduce a phenomenon that a floating touch function is out of work when the user touches the edge of the touchscreen.

Figure 16:
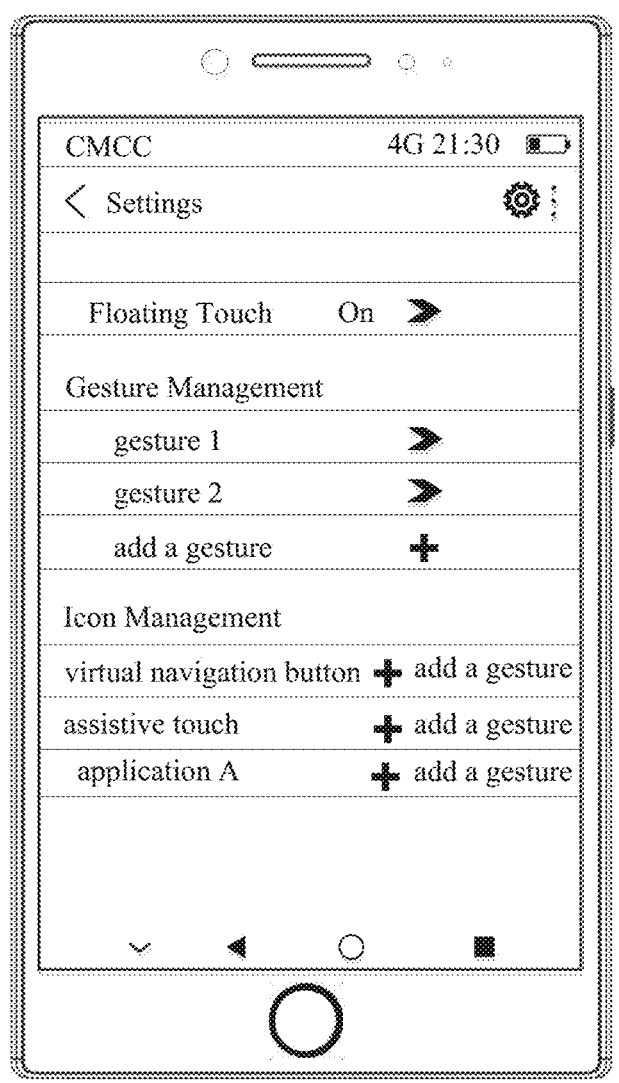
FIG. 16 is a schematic diagram 12 of a scenario of an icon display method according to an embodiment of the present invention.

In addition, as shown in FIG. 16, the user may alternatively manually set the floating touch function and the icon display function on a settings screen. For example, the user may record a self-defined gesture in the terminal, and set a parameter such as an application scenario applicable to the gesture; or the user may manually set a correspondence between different icons and different gestures, so that the terminal can display a corresponding icon when detecting a corresponding gesture. No limitation is imposed in this embodiment of the present invention.

It may be understood that, to implement the foregoing functions, the terminal includes a corresponding hardware structure and/or software module for performing each of the functions, A person of ordinary skill in the art should be easily aware that, the units and algorithm steps in the examples described with reference to the embodiments disclosed in this specification may be implemented by hardware or a combination of hardware and computer software in the embodiments of the present invention. Whether a function is performed by hardware or computer software driving hardware depends on a particular application and design constraint of the technical solutions. A person skilled in the art may use different methods to implement the described functions for all particular applications, but it should not be considered that the implementation goes beyond the scope of the embodiments of the present invention.

An embodiment of the present invention further provides an apparatus capable of executing the foregoing method embodiments. The terminal or the like may be divided into function modules in this embodiment of the present invention based on the foregoing method example. For example, each function module may be obtained through division based on each function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner during actual implementation.

Figure 17:
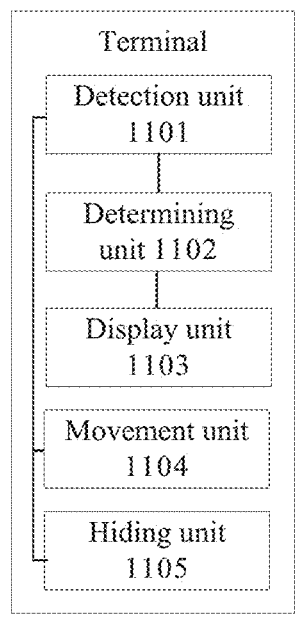
FIG. 17 is a schematic structural diagram 2 of a terminal according to an embodiment of the present invention.

When each function module is obtained through division for each function, FIG. 17 is a possible schematic structural diagram of an apparatus capable of implementing the foregoing method embodiment. The apparatus is an (electronic) terminal and includes a detection unit 1101, a processing unit, and a display unit 1103. The processing unit may be further divided into a determining unit 1102, a movement unit 1104, and a hiding unit 1105.

The detection unit 1101 is configured to support the terminal in performing the procedures 401 and 404 in FIG. 4. The determining unit 1102 is configured to support the terminal in performing the procedure 402 in FIG. 4. The display unit 1103 is configured to support the terminal in performing the procedures 400 and 403 in FIG. 4. The movement unit 1104 is configured to support the terminal in performing the procedure 405 in FIG. 4. The hiding unit 1105 is configured to support the terminal in performing the procedure 406 in FIG. 4. All related content of each step in the foregoing method embodiment may be cited in function descriptions of a corresponding function module. No details are repeated herein.

Figure 18:
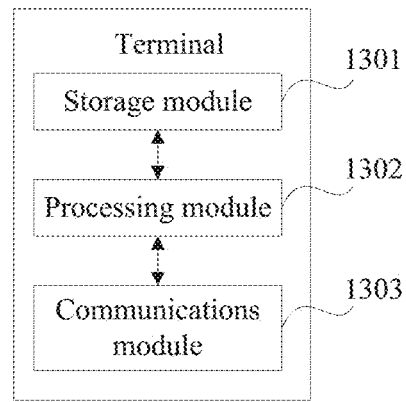
FIG. 18 is a schematic structural diagram 3 of a terminal according to an embodiment of the present invention.

When an integrated unit is used, FIG. 18 is a possible schematic structural diagram of the terminal in the foregoing embodiment. The terminal includes a processing module 1302 and a communications module 1303. The processing module 1302 is configured to perform control and management on an action of the terminal. The communications module 1303 is configured to support communication between the terminal and another network entity. The terminal may further include a storage module 1301 configured to store program code and data of the terminal.

The processing module 1302 may be one or more processors or controllers, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The terminal may implement or execute various examples of logical blocks, modules, and circuits that are described with reference to the content disclosed in the present invention. The processor may alternatively be a combination of processors implementing a computing function, for example, a combination of one or more microprocessors or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal provided in this embodiment of the present invention may be the mobile phone 100 shown in FIG. 2.

All or some of the foregoing embodiments may be implemented by using software, hardware, firmware, or any combination thereof. When a software program is used to implement the embodiments, the embodiments may be all or partially implemented in a form of a computer program product. The computer program product includes one or more computer instructions. When the computer program instruction is loaded and executed on the computer, the procedures or functions according to the embodiments of the present invention are all or partially generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid-State Disk, (SSD)), or the like.

The foregoing descriptions are merely specific implementations of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. An icon display method implemented by a terminal, the icon display method comprising:
   displaying an interface on a touchscreen of the terminal, wherein the interface includes an assistive touch floating icon in a second position of the interface;
   detecting a user gesture corresponding to non-sliding hovering in a first position of the interface above the touchscreen, wherein the first position is different than the second position; and
   displaying the assistive touch floating icon in the first position in response to the user gesture corresponding to the non-sliding hovering in the first position.

2. The icon display method of claim 1, wherein after displaying the assistive touch floating icon, the icon display method further comprises:
   not detecting, within a preset time, an operation for triggering the assistive touch floating icon; and
   hiding the assistive touch floating icon responsive to not detecting the operation within the preset time.

3. The icon display method of claim 1, wherein the user gesture corresponds to a tap gesture, and wherein the icon display method further comprises:
   obtaining, responsive to detecting the user gesture, scenario description data indicating a running status of the terminal; and
   determining the assistive touch floating icon as a target icon to display in the first position based on the running status of the terminal.

4. The icon display method of claim 1, further comprising storing a correspondence between the user gesture and the assistive touch floating icon, wherein the assistive touch floating icon is a target icon corresponding to the gesture.

5. The icon display method of claim 1, further comprising adjusting, according to a detected distance between a finger of a user and the touchscreen, transparency for displaying the assistive touch floating icon such that an adjusted parameter corresponds to the detected distance.

6. The icon display method of claim 1, further comprising adjusting, according to a detected distance between a finger of a user and the touchscreen, color for displaying the assistive touch floating icon such that an adjusted parameter corresponds to the detected distance.

7. The icon display method of claim 1, further comprising adjusting, according to a detected distance between a finger of a user and the touchscreen, display frequency for displaying the assistive touch floating icon such that an adjusted parameter corresponds to the detected distance.

8. The icon display method of claim 1, wherein after displaying the assistive touch floating icon, the icon display method further comprises:
   detecting that a time in which a finger of a user hovers over the touchscreen is greater than a preset threshold; and
   hiding the assistive touch floating icon based on detecting that the time in which the finger of the user hovers over the touchscreen is greater than the preset threshold.

9. A terminal, comprising:
   a touchscreen;
   a processor coupled to the touchscreen; and
   a memory coupled to the processor and storing computer-executable instructions that, when executed by the processor, cause the terminal to:
      display an interface on the touchscreen, wherein the interface includes an assistive touch floating icon in a second position of the interface;
      detect a user gesture corresponding to non-sliding hovering in a first position of the interface above the touchscreen, wherein the first position is different than the second position; and
      display the assistive touch floating icon in the first position in response to the user gesture corresponding to the non-sliding hovering in the first position.

10. The terminal of claim 9, wherein after displaying the assistive touch floating icon, the computer-executable instructions further cause the terminal to:
   detect that a time in which a finger of a user hovers over the touchscreen is greater than a preset threshold; and
   hide the assistive touch floating icon based on detecting that the time in which the finger of the user hovers over the touchscreen is greater than the preset threshold.

11. The terminal of claim 9, wherein the computer-executable instructions further cause the terminal to adjust, according to a detected distance between a finger of a user and the touchscreen, a display frequency for displaying the assistive touch floating icon such that an adjusted parameter corresponds to the detected distance.

12. The terminal of claim 9, wherein the computer-executable instructions further cause the terminal to adjust, according to a detected distance between a finger of a user and the touchscreen, transparency for displaying the assistive touch floating icon such that an adjusted parameter corresponds to the detected distance.

13. The terminal of claim 9, wherein the computer-executable instructions further cause the terminal to adjust, according to a detected distance between a finger of a user and the touchscreen, color for displaying the assistive touch floating icon such that an adjusted parameter corresponds to the detected distance.

14. The terminal of claim 9, wherein the computer-executable instructions further cause the terminal to store a correspondence between the user gesture and the assistive touch floating icon, and wherein the assistive touch floating icon is a target icon corresponding to the user gesture.

15. The terminal of claim 9, wherein the computer-executable instructions further cause the terminal to hide the assistive touch floating icon when an operation for triggering the assistive touch floating icon is not detected within a preset time.

16. A computer program product comprising computer-executable instructions that are stored on a non-transitory computer-readable medium and that, when executed by a processor, cause a terminal to:
   display an interface on a touchscreen of the terminal, wherein the interface includes a first icon in a second position of the interface;
   detect a user gesture corresponding to hovering in a first position of the interface above the touchscreen, wherein the first position is different than the second position;
   obtain, in response to detecting the user gesture, scenario description data indicating that a first application corresponding to the first icon is running in a background of the terminal;
   determine the first icon as a target icon based on the scenario description data indicating that the first application is running in the background of the terminal; and
   display the target icon in the first position in response to the user gesture and based on determining that the first icon is the target icon.

17. The computer program product of claim 16, wherein after displaying the first icon, the computer-executable instructions further cause the terminal to hide the first icon when an operation for triggering the first icon is not detected within a preset time.

18. The computer program product of claim 16, wherein after displaying the first icon, the computer-executable instructions further cause the terminal to:
   detect that a time in which a finger of a user hovers over the touchscreen is greater than a preset threshold; and
   hide the first icon based on detecting that the time in which the finger of the user hovers over the touchscreen is greater than the preset threshold.

19. The computer program product of claim 16, wherein the computer-executable instructions further cause the terminal to adjust, according to a detected distance between a finger of a user and the touchscreen, a display frequency for displaying the first icon such that an adjusted parameter corresponds to the detected distance.

20. The computer program product of claim 16, wherein the computer-executable instructions further cause the terminal to store a correspondence between the user gesture and the first icon.

* * * * *